US009640174B2

(12) United States Patent
Noh et al.

(10) Patent No.: US 9,640,174 B2
(45) Date of Patent: May 2, 2017

(54) HOME APPLIANCE AND OPERATION METHOD THEREOF

(71) Applicant: LG ELECTRONICS INC., Seoul (KR)

(72) Inventors: Seonghwan Noh, Seoul (KR); Sungwook Han, Seoul (KR); Sangbae Park, Seoul (KR); Chansung Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 14/146,316

(22) Filed: Jan. 2, 2014

(65) Prior Publication Data
US 2014/0188463 A1 Jul. 3, 2014

(30) Foreign Application Priority Data

Jan. 2, 2013 (KR) .................. 10-2013-0000340
Jan. 7, 2013 (KR) .................. 10-2013-0001664

(51) Int. Cl.
G10L 15/00 (2013.01)
G10L 21/00 (2013.01)
G08C 19/16 (2006.01)
G10L 11/00 (2006.01)
G10L 15/22 (2006.01)

(52) U.S. Cl.
CPC .................. *G10L 15/00* (2013.01)

(58) Field of Classification Search
CPC ......... G10L 21/00; G10L 11/00; G10L 15/22; G10L 15/00; H04L 12/282; G08C 19/16

USPC .......... 704/275, 270, 201; 340/12.5
See application file for complete search history.

(56) References Cited

U.S. PATENT DOCUMENTS 6,418,324 B1 * 7/2002 Doviak ............... H04L 12/5692
370/401
7,634,065 B2 * 12/2009 Fukunaga ............. H04M 3/38
358/1.13
8,340,975 B1 * 12/2012 Rosenberger .......... G10L 15/22
704/270
8,472,935 B1 * 6/2013 Fujisaki .................. H04W 4/02
455/418

(Continued)

FOREIGN PATENT DOCUMENTS

CN 102148031 A 8/2011

OTHER PUBLICATIONS

Akyildiz et al. "A survey on sensor networks." IEEE communications magazine 40.8 (2002): 102-114.*

(Continued)

Primary Examiner — Pierre-Louis Desir
Assistant Examiner — Seong Ah A Shin
(74) Attorney, Agent, or Firm — Dentons US LLP

(57) ABSTRACT

A home appliance and an operation method thereof are disclosed. The operation method of the home appliance includes entering a voice recognition mode, receiving a voice data through a microphone, recognizing the received voice date, and, in a case in which the recognized voice data contains information related to another home appliance, transmitting the recognized voice data to the corresponding home appliance. Consequently, sharing of voice data between home appliances is achieved.

11 Claims, 51 Drawing Sheets

(56) References Cited

U.S. PATENT DOCUMENTS

| | | | | |
|---|---|---|---|---|
| 2001/0041982 A1* | 11/2001 | Kawasaki | ............... | G10L 15/26 704/275 |
| 2006/0267741 A1* | 11/2006 | Park | ....................... | G08C 17/02 340/12.3 |
| 2010/0090862 A1* | 4/2010 | Dubrow | ................... | H04Q 9/00 340/870.01 |
| 2010/0156666 A1* | 6/2010 | Choi | ....................... | H04B 3/54 340/870.07 |
| 2010/0205655 A1* | 8/2010 | Mokuya | ................ | G06F 21/305 726/4 |
| 2011/0054644 A1* | 3/2011 | Baek | ................... | H04L 12/2803 700/90 |
| 2011/0287753 A1* | 11/2011 | Choi | ................. | H04W 52/0274 455/418 |
| 2012/0061480 A1* | 3/2012 | Deligiannis | .......... | F24F 11/0012 236/51 |
| 2012/0078959 A1* | 3/2012 | Cho | ....................... | G05B 15/02 707/770 |
| 2012/0085829 A1* | 4/2012 | Ziegler | ..................... | G09F 3/14 235/493 |
| 2012/0226502 A1* | 9/2012 | Ouchi | .................. | H04N 5/4403 704/275 |
| 2013/0223279 A1* | 8/2013 | Tinnakornsrisuphap | | H04L 41/0809 370/254 |
| 2014/0167929 A1* | 6/2014 | Shim | ..................... | G08C 17/02 340/12.5 |
| 2014/0167931 A1* | 6/2014 | Lee | ........................ | G08C 17/02 340/12.5 |
| 2014/0224138 A1* | 8/2014 | Tokumaru | ............. | B26F 1/0092 101/26 |

OTHER PUBLICATIONS

Prema et al., "Power Aware Routing Protocol (PARP) for Wireless Sensor Networks." Wireless Sensor Network4.5 (2012): 133.*

* cited by examiner

200a

200b

200c

200f

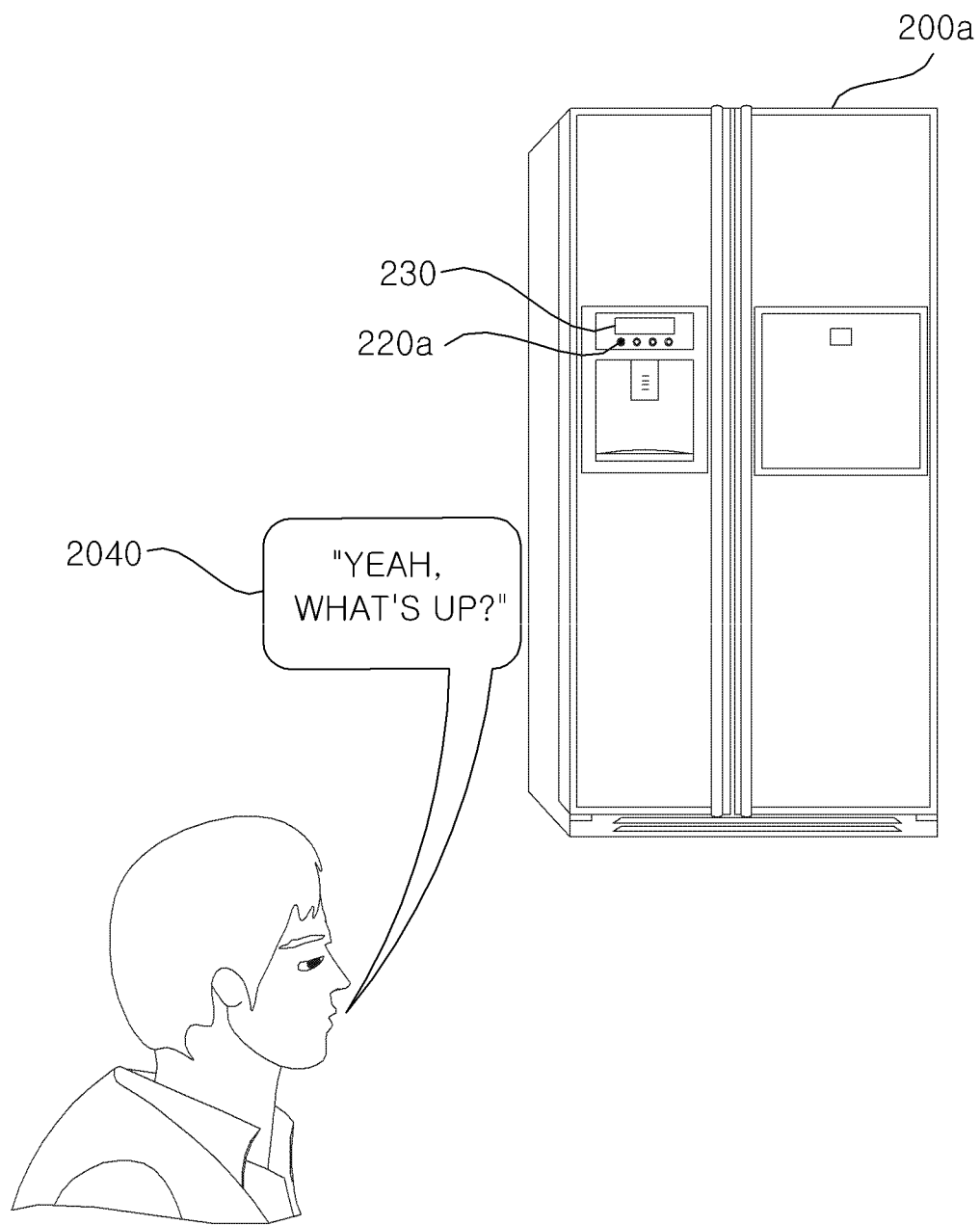

HOME APPLIANCE AND OPERATION METHOD THEREOF

CROSS-REFERENCE TO RELATED APPLICATION

This application claims the priority benefit of Korean Patent Application Nos. 10-2013-0000340, filed on Jan. 2, 2013 and 10-2013-0001664, filed on Jan. 7, 2013, in the Korean Intellectual Property Office, the disclosures of which are incorporated herein by reference.

BACKGROUND OF THE INVENTION

1. Field of the Invention

The present invention relates to a home appliance and an operation method thereof and, more particularly, to a home appliance that is capable of sharing voice data of a user with another home appliance and an operation method thereof.

2. Description of the Related Art

A refrigerator, which is a home appliance disposed in a house, stores food for users, a laundry treatment machine, which is another home appliance, treats laundry, an air conditioner, which is another home appliance, adjusts room temperature, and a cooking device, which is yet another home appliance, cooks food.

With development of various communication modes, research has been conducted into various methods of improving user convenience through communication with the home appliance.

SUMMARY OF THE INVENTION

It is an object of the present invention to provide a home appliance that is capable of sharing voice data of a user with another home appliance and an operation method thereof.

It is another object of the present invention to provide a home appliance that is controllable through voice recognition and an operation method thereof.

In accordance with one aspect of the present invention, the above and other objects can be accomplished by the provision of an operation method of a home appliance including entering a voice recognition mode, receiving a voice through a microphone, recognizing the received voice, and, in a case in which the recognized voice data contains information related to another home appliance, transmitting the recognized voice data to the corresponding home appliance.

In accordance with another aspect of the present invention, there is provided an operation method of a home appliance including receiving voice data from an external home appliance or a mobile terminal, in a case in which the voice data corresponds to an operation control command, perform a corresponding operation, and, in a case in which the voice data corresponds to a voice memo, storing the voice data in a memory.

In accordance with another aspect of the present invention, there is provided a home appliance including a microphone, a wireless communication unit to exchange data with an external device, and a controller to control the wireless communication unit to receive a voice through the microphone upon entering a voice recognition mode and to, in a case in which the recognized voice data contains information related to another home appliance, transmit the recognized voice data to the corresponding home appliance.

In accordance with a further aspect of the present invention, there is provided a home appliance including a memory, a wireless communication unit to receive voice data from an external home appliance, and a controller to, in a case in which the voice data corresponds to an operation control command, control a corresponding operation to be performed and, in a case in which the voice data corresponds to a voice memo, control the voice data to be stored in the memory.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

The terms "module" and "unit," when attached to the names of components, are used herein to aid in understanding of the components and thus should not be considered as having specific meanings or roles. Accordingly, the terms "module" and "unit" may be used interchangeably.

Figure 1:
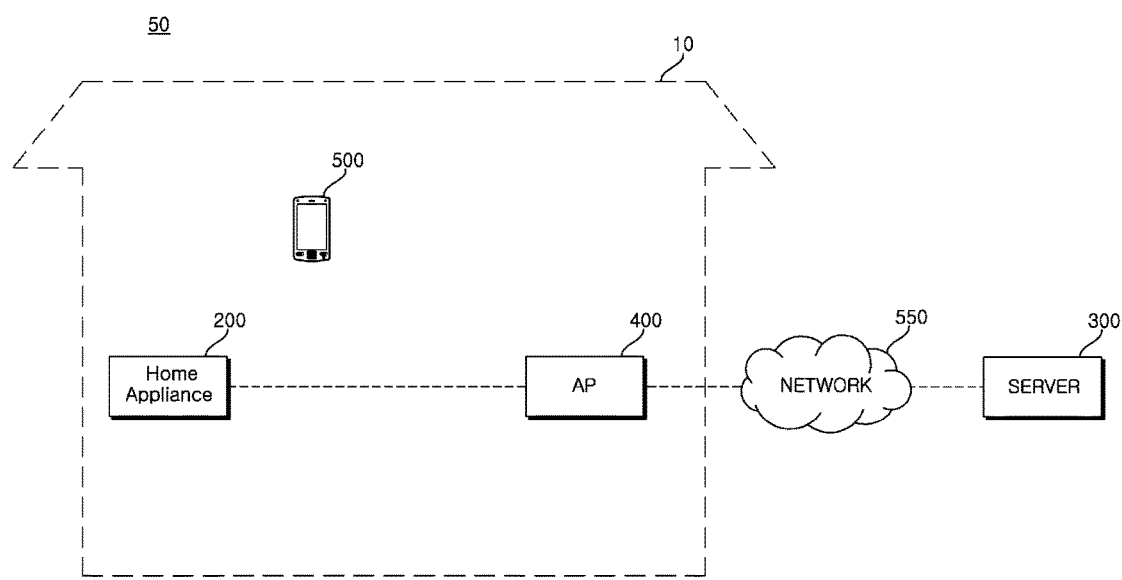
FIG. 1 is a view showing an example of a configuration of a communication system according to an embodiment of the present invention.

FIG. 1 is a view showing an example of a configuration of a communication system according to an embodiment of the present invention.

Referring to FIG. 1, a communication system 50 according to an embodiment of the present invention may include a home appliance 200, a mobile terminal 500, an access point (AP) device 400, and a server 300.

The home appliance 200, the AP device 400, and the mobile terminal 500 of the communication system 50 may constitute an internal network 10. The home appliance 200 may perform wireless data communication with the server 300, which is located outside the internal network 10, via an external network 55.

The home appliance 200 may be an electric device for home use. For example, the home appliance 200 may be a refrigerator 200a (see FIG. 2A), a washing machine 200b (see FIG. 2B), an air conditioner 200c (see FIG. 2C), or a cooking device 200d (see FIG. 2D). In addition, the home appliance 200 may be a cleaner (see FIG. 2E) or a television (TV) (see FIG. 2F).

The home appliance 200 may include a communication unit (not shown) provided therein such that the home appliance 200 exchanges data with electric devices in the internal network 10 or electric devices accessible via the external network 55 through the communication unit (not shown). To this end, the communication unit (not shown) may exchange data with the AP device 400 in a wired or wireless fashion.

Meanwhile, in connection with an embodiment of the present invention, the home appliance 200 may share received voice data with another home appliance in the internal network 10 using a voice recognition function. As a result, user convenience may be improved.

To this end, the home appliances in the internal network 10 may access the AP device 400 in a wired or wireless fashion. Alternatively, the home appliances may communicate with each other one to one.

The AP device 400 may provide the internal network 10 to an electric device adjacent thereto. Specifically, the AP device 400 may provide a wireless network.

Meanwhile, the AP device 400 may assign a wireless channel based on a predetermined communication mode to the electric devices in the internal network 10 and perform wireless data communication through the assigned channel. The predetermined communication mode may be a Wi-Fi communication mode.

In this case, the mobile terminal 500 located in the internal network 10 may access the home appliance 200 via the AP device 400 to monitor or remotely control the home appliance 200.

On the other hand, the AP device 400 may perform data communication with an external electric device via the external network 55 in addition to the internal network 10.

For example, the AP device 400 may perform data communication with a mobile terminal 500 located outside the internal network 10 via the external network 55.

At this time, the mobile terminal 500 located in the external network 55 may access the home appliance 200 via the external network 55 and the AP device 400 to monitor or remotely control the home appliance 200.

In another example, the AP device 400 may perform wireless data communication with the server 300, which is located outside the internal network 10, via the external network 55.

The server 300 may be provided with a voice recognition algorithm. In addition, upon receiving voice data, the server 300 may convert the received voice data into text format data and output the converted data.

Meanwhile, the server 300 may store firmware information regarding the home appliance 200 and operation information (course information, etc.) and register product information regarding the home appliance 200. For example, the server 300 may be a server managed by a manufacturer of the home appliance 200. In another example, the server 300 may be a server managed by an open application store administrator.

In another embodiment of the present invention, the mobile terminal 500 may receive a voice using a microphone and transmit voice data to the home appliance 200 in a voice transmission mode. At this time, in order to recognize the received voice, the mobile terminal 500 may use a voice recognition algorithm provided therein or access the external server 300 to use the voice recognition algorithm provided in the external server 300.

In addition, the mobile terminal 500 may transmit the recognized voice data to the home appliance 200.

In a case in which the voice data received by the home appliance 200 corresponds to an operation control command, the home appliance 200 may perform a corresponding operation. On the other hand, in a case in which the voice data received by the home appliance 200 corresponds to a voice memo, the home appliance 200 may store the voice data in a memory. In addition, in a case in which the voice data received by the home appliance 200 corresponds to a request for telephone conversation, the home appliance 200 may receive a call to perform telephone conversation.

As described above, the mobile terminal 500 may variously control the home appliance 200 through voice recognition.

FIGS. 2A to 2F are views illustrating various examples of home appliances.

Figure 2A:
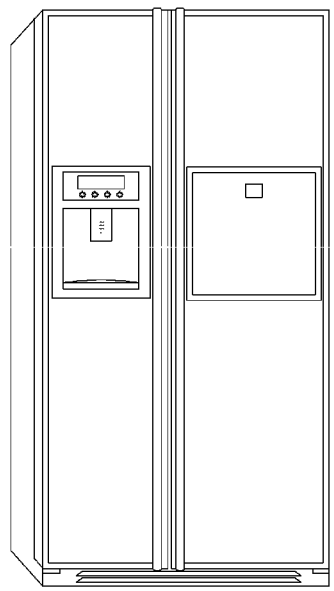
FIGS. 2A to 2F are views illustrating various examples of home appliances.
Figure 2B:
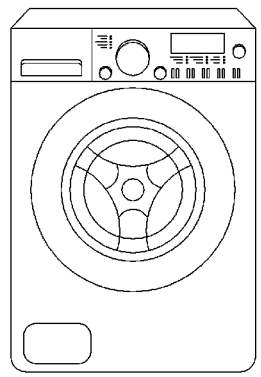
Figure 2C:
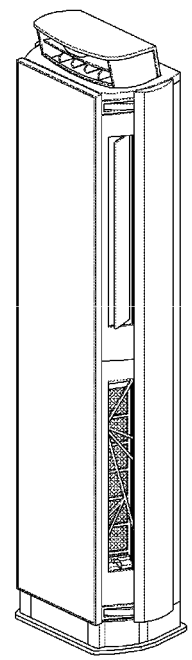
Figure 2D:
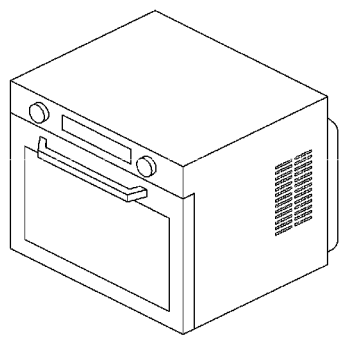
Figure 2E:
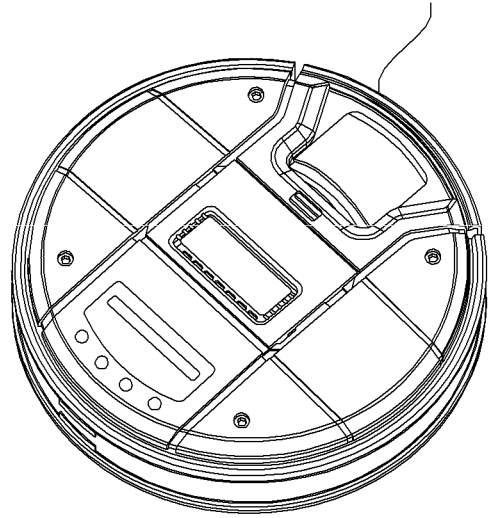
Figure 2F:
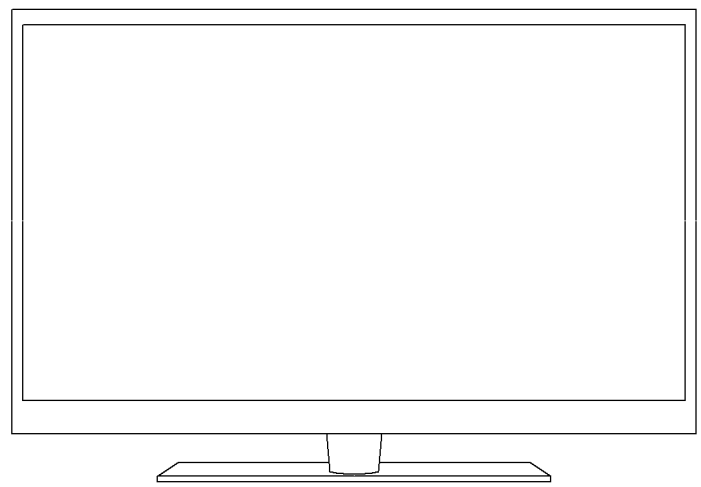

FIG. 2A illustrates a refrigerator 200a, FIG. 2B illustrates a washing machine 200b, FIG. 2C illustrates an air conditioner 200c, FIG. 2D illustrates a cooking device 200d, FIG. 2E illustrates a cleaner 200e, and FIG. 2F illustrates a TV 200f. However, various other examples of home appliances may be given.

Figure 3A:
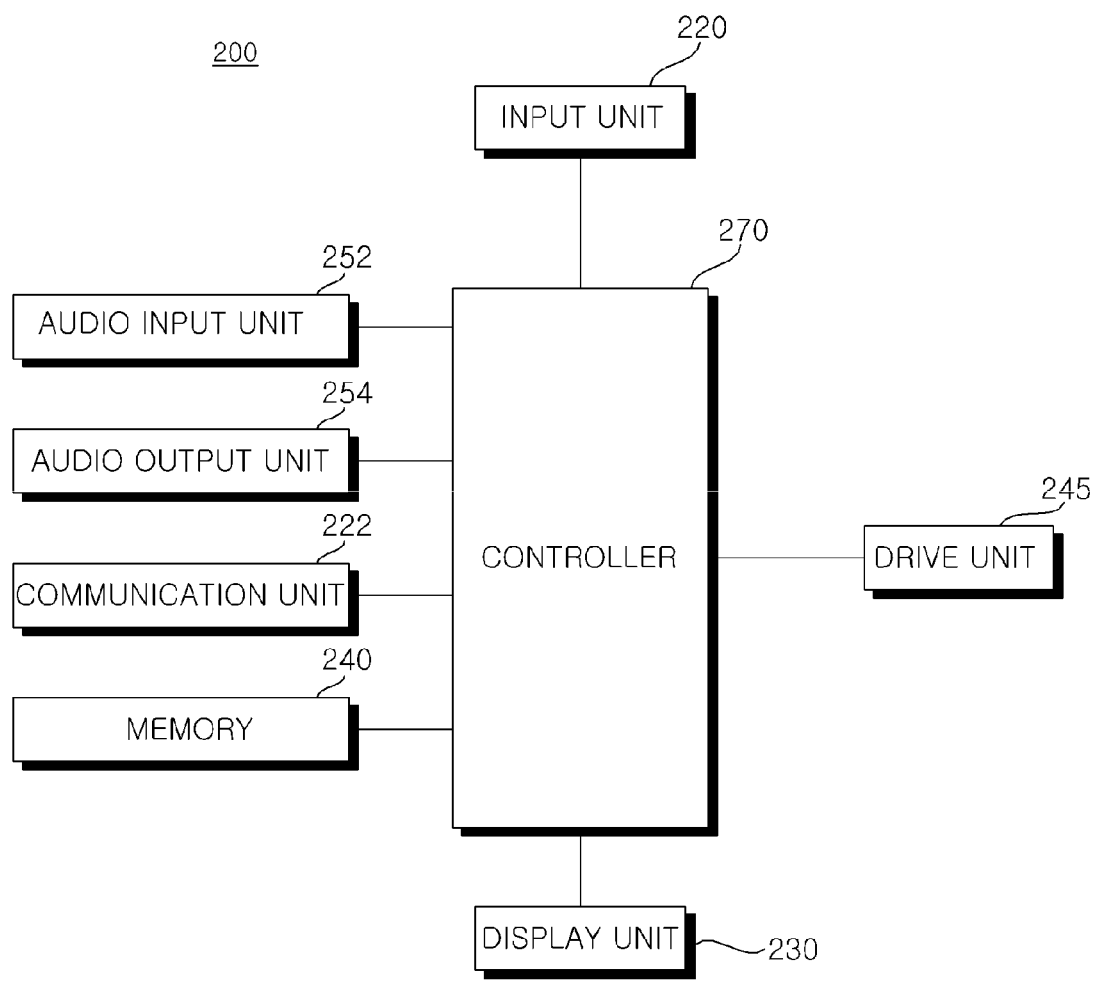
FIG. 3A is an internal block diagram schematically showing a home appliance of FIG. 1.

FIG. 3A is an internal block diagram schematically showing the home appliance of FIG. 1.

Referring to FIG. 3A, the home appliance 200 may include an input unit 220 to allow a user input, a display unit 230 to display an operation state of the home appliance, a communication unit 222 to communicate with an external device, a drive unit 245 to drive the home appliance, a controller 270 to perform internal control, a memory 240, an audio input unit 252, and an audio output unit 254.

The input unit 220 may include a local key to allow a user input as previously described with reference to FIG. 1.

The drive unit 245 may include different drive units according to kind of the home appliance.

For example, in a case in which the home appliance is a refrigerator, the drive unit 245 may include a refrigerating compartment drive unit to drive a refrigerating compartment fan configured to supply cooled air into a refrigerating compartment, a freezing compartment drive unit to drive a freezing compartment fan configured to supply cooled air into a freezing compartment, and a compressor drive unit to drive a compressor configured to compress a refrigerant.

In another example, in a case in which the home appliance is a washing machine, the drive unit 245 may include a drive unit to drive a drum or a tub.

In another example, in a case in which the home appliance is an air conditioner, the drive unit 245 may include a compressor drive unit to drive a compressor mounted in an outdoor unit, an outdoor unit fan drive unit to drive an outdoor unit fan configured to perform heat exchange, and an indoor unit fan drive unit to drive an indoor unit fan configured to perform heat exchange.

In another example, in a case in which the home appliance is a cooking device, the drive unit 245 may include a microwave drive unit to output microwaves into a cavity.

In a further example, in a case in which the home appliance is a cleaner, the drive unit 245 may include a fan motor drive unit to drive a fan motor configured to suction air.

Meanwhile, the communication unit 222 may include a wireless communication unit (not shown) to perform wireless communication at least.

The communication unit 222 may include a wireless communication unit (not shown) to perform wireless communication with the AP device 400 (see FIG. 1). The wireless communication unit (not shown) may perform Wi-Fi communication. The communication unit 222 may perform wireless data communication with the mobile terminal 500 (see FIG. 1) via the AP device 400. For example, the communication unit 222 may receive a remote control signal from the mobile terminal 500 and transmit the received remote control signal to the controller 270.

On the other hand, the communication unit 222 may receive power information from a power information transmission device (not shown). To this end, the communication unit 222 may further include a communication module (not shown) in addition to the wireless communication unit (not shown).

The communication unit 222 may be provided in the home appliance. Alternatively, the communication unit 222 may be fixed to a case of the home appliance 200 in a state in which the communication unit 222 is connected to an internal circuit of the home appliance in a wired fashion.

The memory 240 may store various kinds of data necessary to operate the home appliance 200. On the other hand, the memory 240 may be provided with a voice recognition algorithm.

The audio input unit 252 may allow input of a user's voice. To this end, the audio input unit 252 may include a microphone. The received voice may be converted into an electric signal, which may be transmitted to the controller 270.

The audio output unit 254 converts the electric signal received from the controller 270 into an audio signal and outputs the audio signal. To this end, the audio output unit 254 may include a speaker.

The controller 270 may control overall operation of the home appliance. Specifically, the controller 270 may control operations of the input unit 220, the display unit 230, the communication unit 222, the drive unit 245, the memory 240, the audio input unit 252, and the audio output unit 254.

Meanwhile, in connection with an embodiment of the present invention, the controller 270 may receive a voice through the microphone at the time of entering a voice recognition mode and, in a case in which information related to another home appliance is included in recognized voice data, control the wireless communication unit to transmit the recognized voice data to the corresponding home appliance.

Figure 3B:
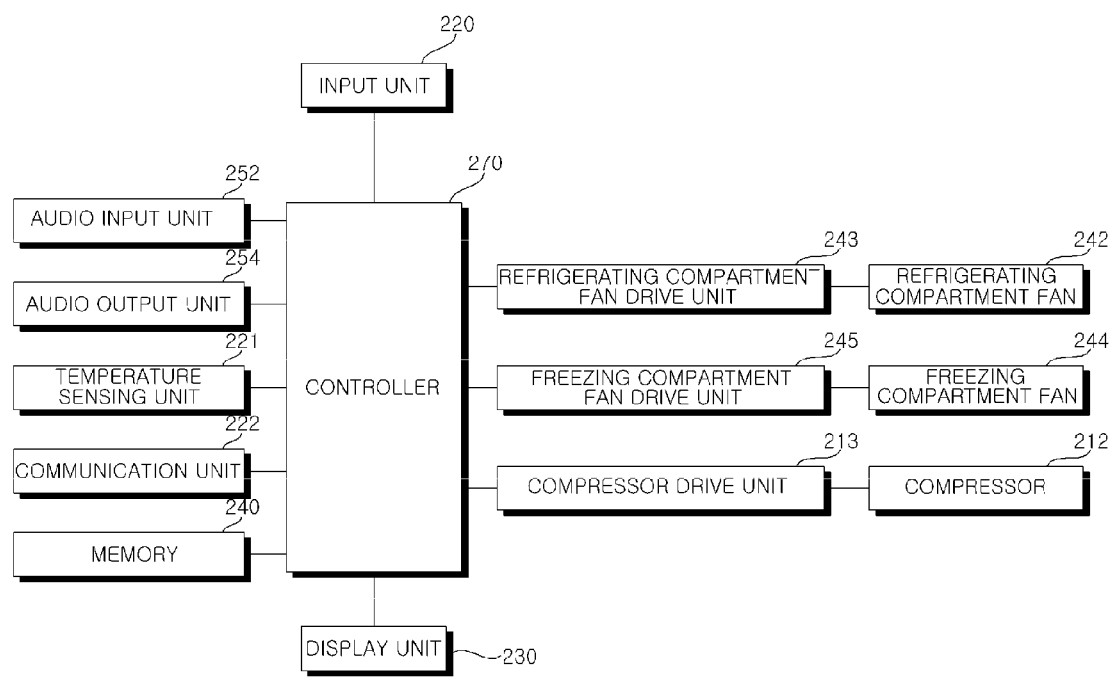
FIG. 3B is an internal block diagram schematically showing a home appliance of FIG. 2A.

FIG. 3B is a block diagram schematically showing the interior of the refrigerator of FIG. 2A.

Referring to FIG. 3B, the refrigerator may include a compressor 212, a refrigerating compartment fan 242, a freezing compartment fan 244, a controller 270, a temperature sensing unit 221, a communication unit 222, a memory 240, an input unit 220, a display unit 230, an audio input unit 252, and an audio output unit 254. In addition, the refrigerator may further include a compressor drive unit 213, a refrigerating compartment fan drive unit 243, and a freezing compartment fan drive unit 245.

The input unit 220 may include a plurality of manipulation buttons. The input unit 220 transmits a freezing compartment set temperature or a refrigerating compartment set temperature input thereto to the controller 270.

The display unit 230 may display information regarding a state of the refrigerator according to a user input. For example, the display unit 230 may display a current freezing compartment temperature or a current refrigerating compartment temperature.

The temperature sensing unit 221 senses an internal temperature of the refrigerator and transmits a signal regarding the sensed temperature to the controller 270. Specifically, the temperature sensing unit 221 senses a refrigerating compartment temperature and a freezing compartment temperature. In addition, the temperature sensing unit 221 may sense each space in the refrigerating compartment or each space in the freezing compartment.

The memory 240 may store various kinds of data necessary to operate the refrigerator. On the other hand, the memory 240 may be provided with a voice recognition algorithm.

The audio input unit 252 may allow input of a user's voice. To this end, the audio input unit 252 may include a microphone. The received voice may be converted into an electric signal, which may be transmitted to the controller 270.

The audio output unit 254 converts the electric signal received from the controller 270 into an audio signal and outputs the audio signal. To this end, the audio output unit 254 may include a speaker.

As previously described, the communication unit 222 operates to exchange data with an external electric device in a wired or wireless fashion. For example, the communication unit 222 may exchange data with the AP device 400 and exchange data with the electric device in the internal network 10 via the AP device 400. Alternatively, the communication unit 222 may exchange data with various electric devices outside the internal network 10 via the AP device 400 and the external network 55.

As shown in FIG. 3B, the controller 270 may directly control the compressor drive unit 213 and the fan drive unit 243 or 245 in order to control on/off of the compressor 212 and the fan 242 or 244. The fan drive unit may be the refrigerating compartment fan drive unit 243 or the freezing compartment fan drive unit 245.

For example, the controller 270 may include a microprocessor provided therein to output a signal regarding a speed command value to the compressor drive unit 213 or the fan drive unit 243 or 245.

The compressor drive unit 213, the refrigerating compartment fan drive unit 243, and the freezing compartment fan drive unit 245 include a compressor motor (not shown), a refrigerating compartment fan motor (not shown), and a freezing compartment fan motor (not shown), respectively. Each motor (not shown) is driven at a target rotation speed under control of the controller 270.

In a case in which each motor is a three phase motor, the motor may be controlled according to switching in an inverter (not shown) or may be controlled at a constant speed using alternating current power. Each motor (not shown) may be any one selected from among an induction motor, a brushless direct current (BLDC) motor, and a synchronous reluctance motor (synRM).

On the other hand, the controller 270 may control overall operation of the refrigerator 200a in addition to controlling the operations of the compressor 212 and the fan 242 or 244 as described above. That is, the controller 270 may control overall operation of a refrigerant cycle according to the temperature set through the input unit 220. For example, the controller 270 may further control a three-way valve (not shown), a refrigerating compartment expansion valve (not shown), and a freezing compartment expansion valve (not shown) in addition to the compressor drive unit 213, the refrigerating compartment fan drive unit 243, and the freezing compartment fan drive unit 245. In addition, the controller 270 may also control operation of a condenser (not shown). Furthermore, the controller 270 may also control operation of the display unit 230.

Figure 4:
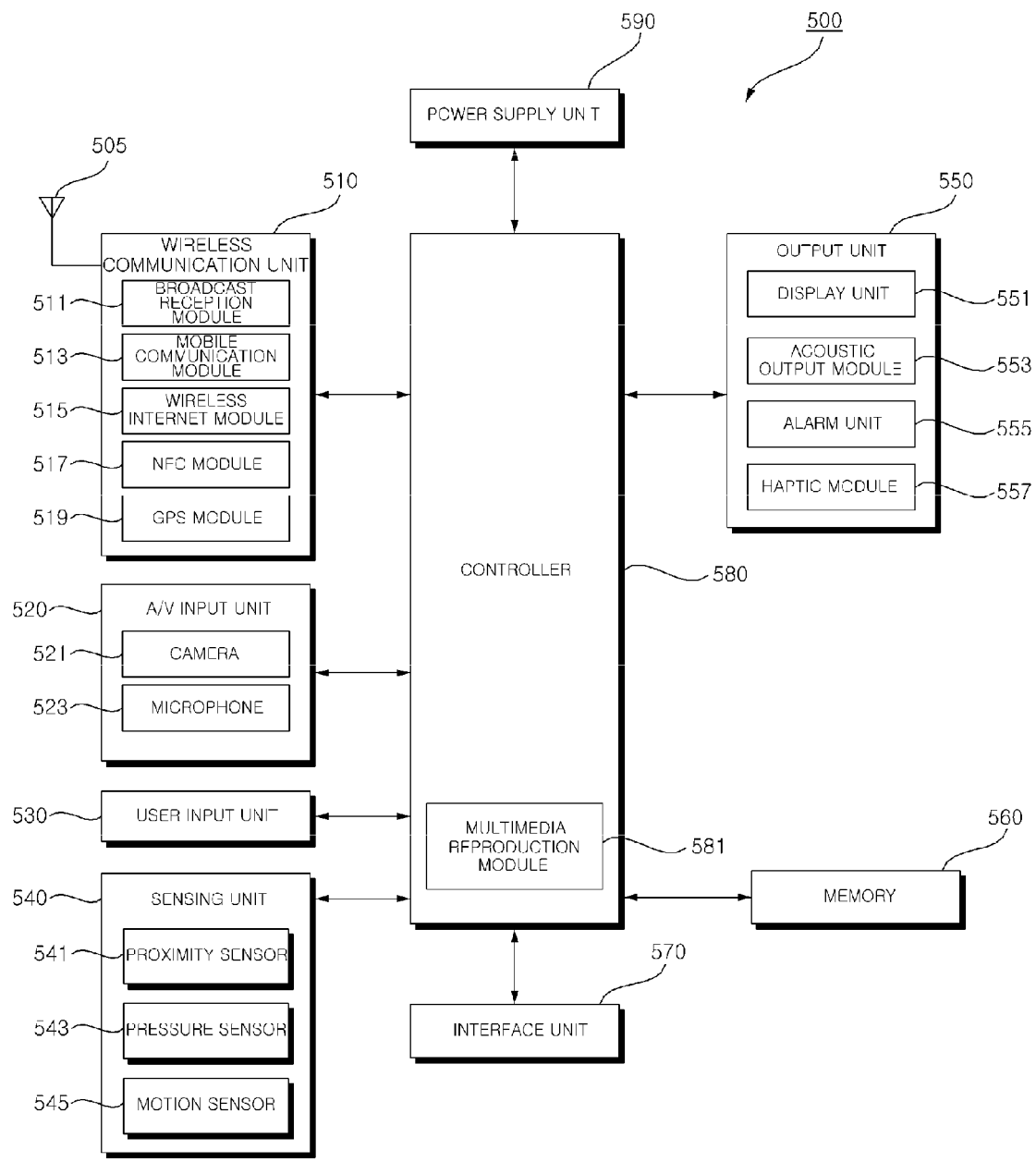
FIG. 4 is an internal block diagram showing a mobile terminal of FIG. 1.

FIG. 4 is an internal block diagram showing the mobile terminal of FIG. 1.

Referring to FIG. 4, the mobile terminal 500 may include a wireless communication unit 510, an audio/video (A/V) input unit 520, a user input unit 530, a sensing unit 540, an output unit 550, a mobile terminal memory 560, an interface unit 570, a mobile terminal controller 580, and a power supply unit 590.

The wireless communication unit 510 may include a broadcast reception module 511, a mobile communication module 513, a wireless Internet module 515, a near field communication (NFC) module 517, and a global positioning system (GPS) module 519.

The broadcast reception module 511 may receive a broadcast signal and/or broadcast-related information from an external broadcast management server through a broadcast channel. The broadcast channel may include a satellite channel and a terrestrial channel.

The broadcast signal and/or the broadcast-related information received through the broadcast reception module 511 may be stored in the memory 560.

The mobile communication module 513 transmits and receives a wireless signal to and from at least one selected from among a base station, an external terminal, and a server via a mobile communication network. The wireless signal may include a voice call signal, a video communication call signal, and various types of data based on text/multimedia message transmission and reception.

The wireless Internet module 515 is a module for wireless Internet access. The wireless Internet module 515 may be mounted inside or outside the mobile terminal 500. For example, the wireless Internet module 515 may perform wireless communication based on Wi-Fi or wireless communication based on Wi-Fi Direct.

The NFC module 517 may perform wireless communication. In a case in which the NFC module 517 is within a predetermined distance from a home appliance equipped with an NFC tag or an NFC module, i.e., the NFC module 517 performs tagging, the NFC module 517 may receive or transmit data from or to the home appliance.

In addition, Bluetooth, radio frequency identification (RFID), infrared data association (IrDA), ultra wideband (UWB), or ZigBee may be used as short range communication technology.

The GPS module 519 may receive position information from a plurality of GPS satellites.

The A/V input unit 520 is provided to allow an audio signal or video signal input. The A/V input unit 520 may include a camera 521 and a microphone 523.

The user input unit 530 generates key input data inputted by a user to control the operation of the terminal. To this end, the user input unit 530 may include a keypad, a dome switch, and a touch pad (static pressure or electrostatic). Particularly, in a case in which the touch pad forms a layered structure together with an output display unit 551, an assembly of the touch pad and the output display unit 551 may be called a touchscreen.

The sensing unit 540 may sense a current state of the mobile terminal 500, such as an open or closed state of the mobile terminal 500, the position of the mobile terminal 500, and whether user contact with the mobile terminal 500 has been performed, to generate a sensing signal to control the operation of the mobile terminal 500.

The sensing unit 540 may include a proximity sensor 541, a pressure sensor 543, and a motion sensor 545. The motion sensor 545 may sense the motion or position of the mobile terminal 500 using an acceleration sensor, a gyro sensor, a gravity sensor, or any other suitable sensor known to one of skill in the art. In particular, the gyro sensor is a sensor to measure angular velocity of the mobile terminal 500. The gyro sensor may sense a direction (angle) of the mobile terminal 500 rotated from a reference direction.

The output unit 550 may include a output display unit 551, an acoustic output module 553, an alarm unit 555, and a haptic module 557.

The display unit 551 outputs, i.e., displays, information processed by the mobile terminal 500.

Meanwhile, in a case in which the output display unit 551 and the touch pad are disposed as a layered structure to form a touchscreen as previously described, the output display unit 551 may also be used as an input device that allows a user to input information by touch in addition to an output device.

The acoustic output module 553 outputs audio data received from the wireless communication unit 510 or stored in the mobile terminal memory 560. The acoustic output module 553 may include a speaker and a buzzer.

The alarm unit 555 outputs a signal to inform about generation of an event of the mobile terminal 500. For example, the alarm unit 555 may output a signal in the form of vibration.

The haptic module 557 generates a variety of tactile effects that a user may feel. A typical example of the tactile effects generated by the haptic module 557 is a vibration effect.

The mobile terminal memory 560 may store a program for processing or control of the mobile terminal controller 580 or temporarily store input or output data (for example, phonebooks, messages, still images, moving images, etc.).

The interface unit 570 interfaces between the mobile terminal 500 and all external devices connected to the mobile terminal 500. The interface unit 570 may receive data or power from the external devices and transmit the received data or power to the respective components of the mobile terminal 500. In addition, data may be transmitted from the mobile terminal 500 to the external devices via the interface unit 570.

The mobile terminal controller 580 controls operations of the respective components of the mobile terminal 500, thereby controlling overall operation of the mobile terminal 500. For example, the controller 580 may perform control or processing for voice communication, data communication, and video communication. In addition, the mobile terminal controller 580 may further include a multimedia reproduction module 581 to reproduce multimedia. The multimedia reproduction module 581 may be incorporated into the mobile terminal controller 580 in the form of hardware. Alternatively, the multimedia reproduction module 581 may be configured in the form of software separate from the mobile terminal controller 580.

The power supply unit 590 supplies external power or internal power to the respective components of the mobile terminal 500 under control of the mobile terminal controller 580.

The block diagram of FIG. 4 shows components constituting the mobile terminal 500 according to an embodiment of the present invention. The respective components in the block diagram may be integrated, added, or omitted according to the specifications of an actually implemented mobile terminal 500. That is, two or more components may be combined into a single unit as needed. Alternatively, one component may be divided into two or more components as needed. In addition, functions performed by the respective blocks are illustrated to describe an embodiment of the present invention and, therefore, concrete operations or devices of the respective blocks do not restrict the scope of rights claimed by the present invention.

Figure 5:
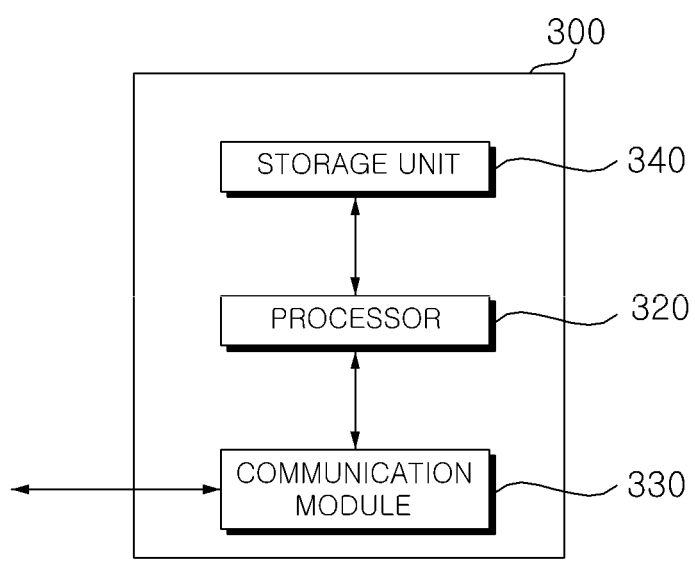
FIG. 5 is an internal block diagram showing a server of FIG. 1.

FIG. 5 is an internal block diagram showing the server 300 of FIG. 1.

Referring to FIG. 5, the server 300 is a device that receives data regarding the home appliance 200 or the mobile terminal 500 and transmits relevant information. The server 300 may include a server communication module 330, a storage unit 340, and a processor 320.

The server communication module 330 may receive voice data from the home appliance 200 or the mobile terminal 500. In addition, the server communication module 330 may transmit voice-recognized text format voice data to the home appliance 200 or the mobile terminal 500.

In addition, the server communication module 330 may receive product information related to the home appliance 200 from the home appliance 200 or the mobile terminal 500. When registration of the home appliance is completed, therefore, the communication module 330 of the server 300 may transmit information regarding completion of the registration.

In addition, the communication module 330 of the server 300 may receive a firmware update request for the home appliance 200 from the home appliance 200 or the mobile terminal 500. Consequently, the server communication module 330 may transmit updated firmware to the home appliance 200 or the mobile terminal 500.

The storage unit 340 may store data regarding overall operation of the refrigerator. In addition, the storage unit 340 may store a voice recognition algorithm. In addition, the storage unit 340 may store the product information related to the home appliance 200 received from the home appliance 200 or the mobile terminal 500.

The server processor 320 may control overall operation of the server 300. For example, the server processor 320 may convert voice data received from the home appliance 200 or the mobile terminal 500 into text format voice data using a voice recognition algorithm and control the converted voice data to be transmitted to the home appliance 200 or the mobile terminal 500.

In another example, upon receiving production information from the home appliance 200 or the mobile terminal 500, the server processor 320 may control the product to be registered.

In a further example, upon receiving a firmware update request from the home appliance 200 or the mobile terminal 500, the server processor 320 may control updated firmware to be transmitted to the home appliance 200 or the mobile terminal 500.

Figure 6:
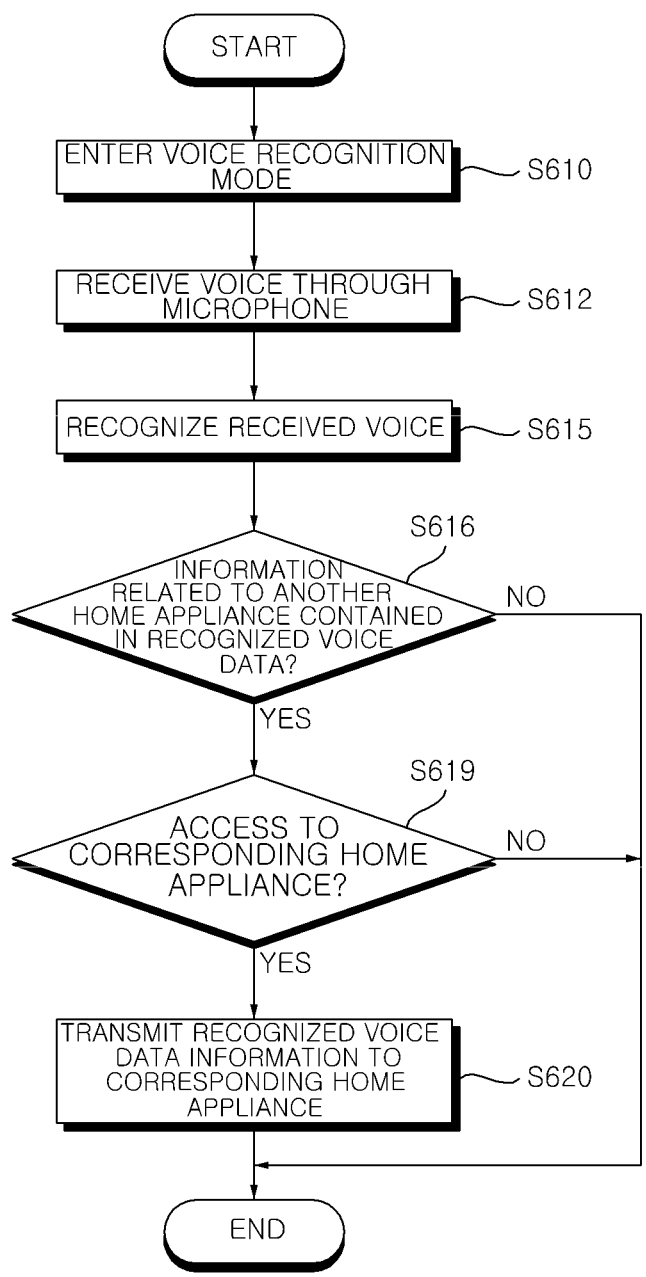
FIG. 6 is a flowchart showing an operation method of a home appliance according to an embodiment of the present invention.
Figure 7:
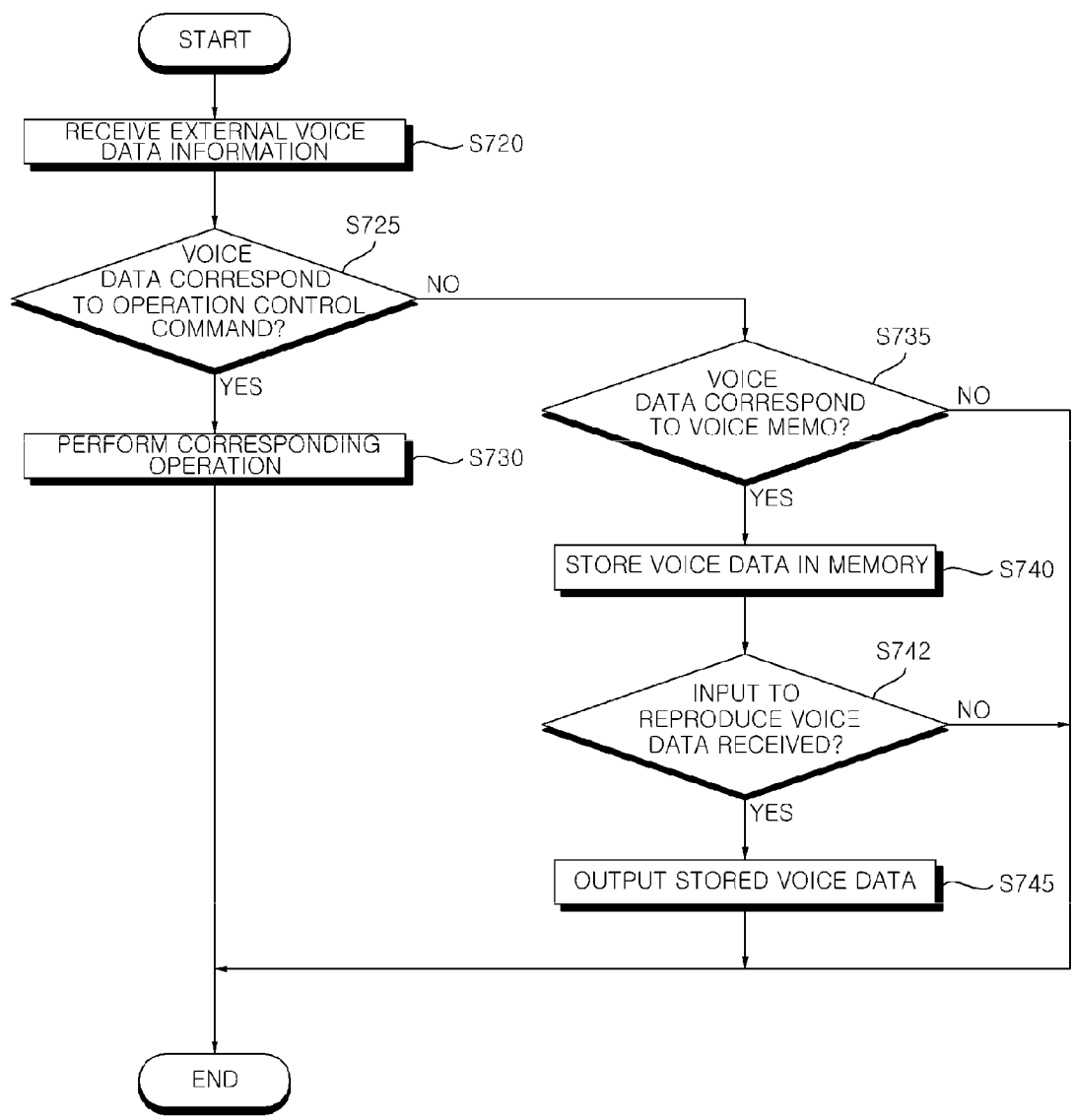
FIG. 7 is a flowchart showing an operation method of a home appliance according to another embodiment of the present invention.
Figure 8:
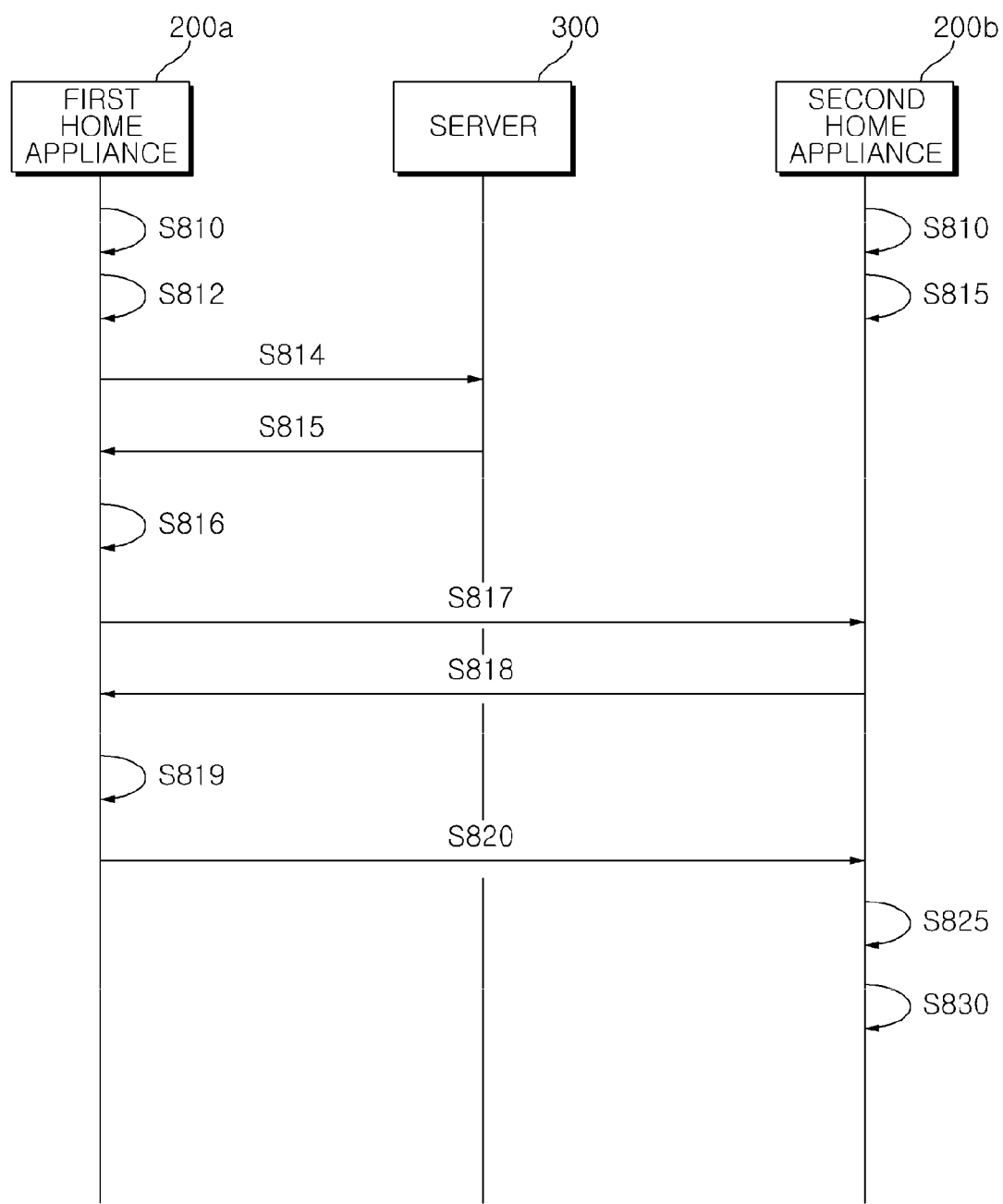
FIGS. 8 to 14C are reference views illustrating the operation method of FIG. 6 or 7.

FIG. 6 is a flowchart showing an operation method of a home appliance according to an embodiment of the present invention, FIG. 7 is a flowchart showing an operation method of a home appliance according to another embodiment of the present invention, and FIGS. 8 to 14C are reference views illustrating the operation method of FIG. 6 or 7.

Referring first to FIG. 6, a first home appliance 200*a* may enter a voice recognition mode (S610). Meanwhile, step S810 of FIG. 8 corresponds to step S610 of FIG. 6.

The voice recognition mode may be a mode to recognize a voice input to the first home appliance 200*a*. The controller 270 of the home appliance may enter the voice recognition mode according to a user input. Upon entering the voice recognition mode, the controller 270 of the home appliance may activate the microphone of the audio input unit 252.

Subsequently, the home appliance may receive a voice through the microphone (S612). Meanwhile, step S812 of FIG. 8 corresponds to step S612 of FIG. 6.

Upon receiving a voice input from a user in a state in which the microphone of the audio input unit 252 of the home appliance is activated, the microphone of the audio input unit 252 may receive the voice and transmit the received voice to the controller 270.

Subsequently, the home appliance recognizes the received voice (S615). Meanwhile, step S815 of FIG. 8 corresponds to step S615 of FIG. 6.

The controller 270 may perform signal processing with respect to the input voice and perform voice recognition.

For example, in a case in which the memory 240 of the home appliance is provided with a voice recognition algorithm, the controller 270 may recognize the voice of the user using the voice recognition algorithm. That is, the controller 270 may convert a voice signal into a text signal.

In another example, in a case in which the memory 240 of the home appliance is not provided with a voice recognition algorithm, the controller 270 may access the server 300 using the communication unit 222 and recognize the voice of the user using the voice recognition algorithm provided in the server 300. That is, the controller 270 may convert a voice signal into a text signal.

Subsequently, the home appliance determines whether the recognized voice data includes information related to another home appliance (S616). Upon determining that the recognized voice data includes the information related to the corresponding home appliance, the home appliance determines whether the home appliance can access the corresponding home appliance (S619). Upon determining that the home appliance can access the corresponding home appliance, the home appliance transmits the recognized voice data information to the corresponding home appliance (S620). Meanwhile, steps S816, S819, and S820 of FIG. 8 may correspond to steps S616, S619, and S820 of FIG. 6, respectively.

The controller 270 determines whether the recognized voice data includes information related to another home appliance. For example, in a case in which the recognized voice data includes name (cooking device, TV, etc.) of another home appliance or terms (broadcast view, broadcast program, temperature, etc.) related to a main operation of another home appliance, the controller 270 may decide to transmit the recognized voice data to the corresponding home appliance.

Upon deciding to transmit the voice data to another home appliance, the controller 270 may determine whether the home appliance can access the corresponding home appliance. For example, in a case in which the corresponding home appliance is on and the communication unit of the corresponding home appliance normally operates, the home appliance can access the corresponding home appliance.

Consequently, the controller 270 may control the communication unit 222 to transmit an access signal to the corresponding home appliance such that the home appliance can access the corresponding home appliance. In a case in which a response signal to the access signal is received within a predetermined time, the controller 270 may determine that the home appliance can access the corresponding home appliance.

Subsequently, the controller 270 may control the recognized voice data to be transmitted to the corresponding home appliance which the home appliance can access.

Next, referring to FIG. 7, a second home appliance 200b receives the voice data from the first home appliance 200a (S720). Meanwhile, step S820 of FIG. 8 may correspond to step S720 of FIG. 7.

The communication unit of the second home appliance 200b may receive the voice data from the first home appliance 200a.

Subsequently, the second home appliance 200b may determine whether the received voice data is an operation control command (S725). Upon determining that the received voice data is the operation control command, the second home appliance 200b is controlled to perform an operation according to the operation control command (S730). Meanwhile, steps S825 and S830 of FIG. 8 may correspond to steps S725 and S730 of FIG. 7, respectively.

For example, in a case in which the received voice data is voice data of "Turn the washing machine on," it is possible to turn on the second home appliance 200b, i.e., the washing machine. Specifically, the washing machine, which is in a standby mode, may be turned on to activate the display unit and the input unit of the washing machine.

Subsequently, upon determining at step S725 that the received voice data is not the operation control command, step S735 and the following steps may be performed.

The second home appliance 200b may determine whether the received voice data is a voice memo (S735). Upon determining that the received voice data is the voice memo, the second home appliance 200b stores the voice memo in the memory 240 (S740). Upon receiving a reproduction input (S742), the second home appliance 200b reproduces and outputs the stored voice memo (S745). Meanwhile, steps S835, S840, S842, and S845 of FIG. 8 may correspond to steps S735, S740, S742, and S745 of FIG. 7, respectively.

In a case in which the received voice data is voice data of "I will attend a company dinner today. Wash the laundry in the washing machine," therefore, the controller of the second home appliance 200b may control the received voice data to be stored in the memory 240.

Meanwhile, upon receiving the voice memo, the controller of the second home appliance 200b may control a message indicating the reception of the voice memo to be output. As a result, the user may intuitively recognize the reception of the voice memo.

When the user pushes a specific button in the input unit 220 of the second home appliance 200b, the voice memo stored in the memory may be reproduced and outputted. As a result, the user may easily and conveniently confirm the stored memo.

Figure 9:
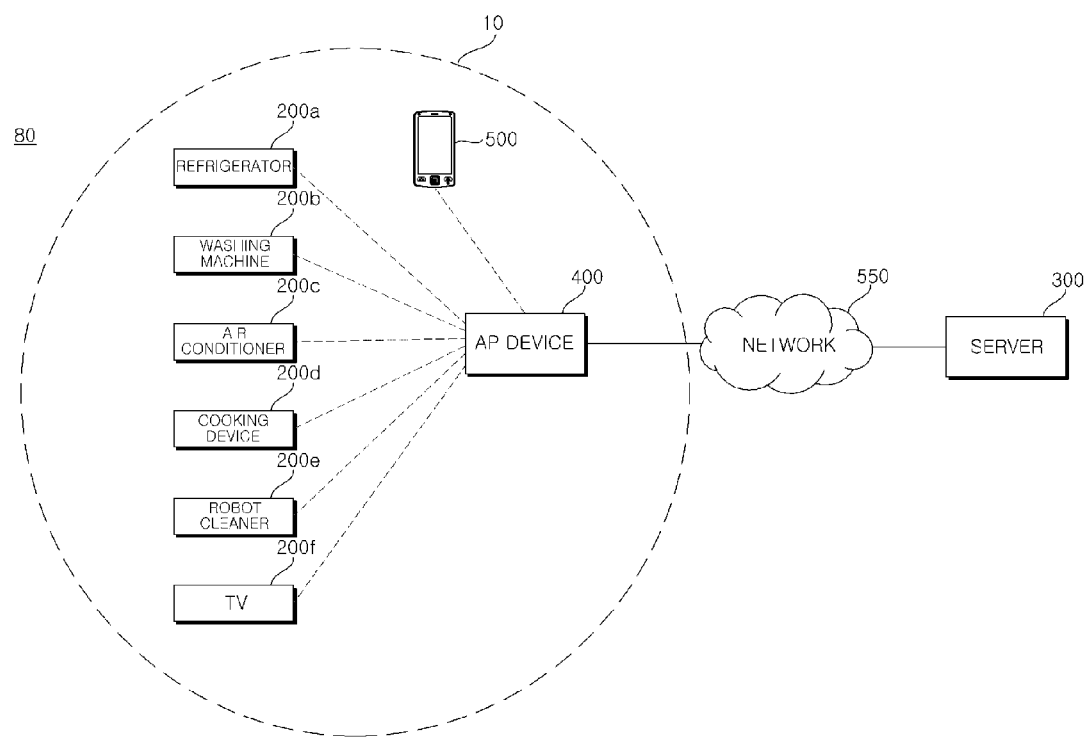

FIG. 9 illustrates that a plurality of home appliances accesses the AP device 400 in a wireless fashion in the internal network 10.

That is, the refrigerator 200a, the washing machine 200b, the air conditioner 200c, the cooking device 200d, the cleaner 200e, and the TV 200f may access the AP device 400 in a wireless fashion. On the other hand, the mobile terminal 500 may also access the AP device 400 in a wireless fashion. Consequently, it is possible to share voice data of the user in the internal network 10.

Meanwhile, the home appliances 200a to 200f may access the external server 300 via the AP device 400 and the external network 55.

FIGS. 10A to 10D illustrate sharing of voice data between the refrigerator 200a and the washing machine 200b.

Figure 10A:
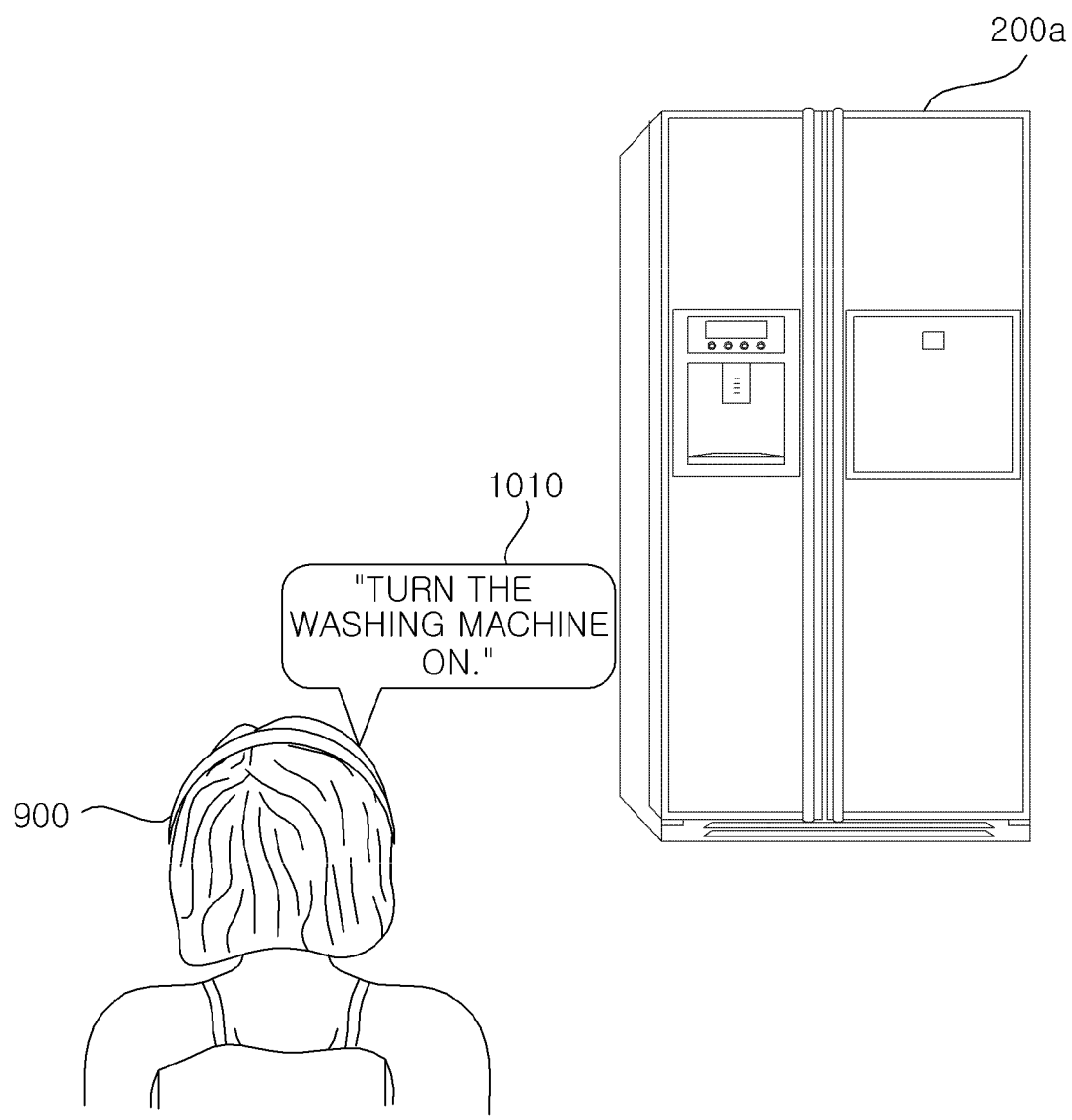

FIG. 10A illustrates that a user 900 inputs a voice data 1010 of "Turn the washing machine on." to the refrigerator 200a. As a result, the audio input unit 252 of the refrigerator 200a may receive the voice data 1010 and transmit the received voice data 1010 to the controller 270.

Figure 10B:
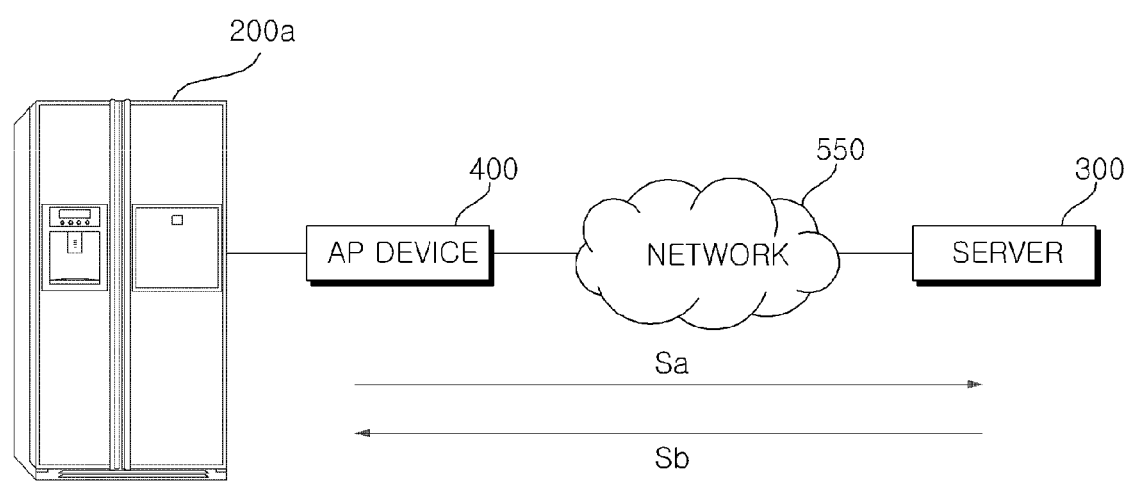

FIG. 10B illustrates that the refrigerator 200a exchanges data with the server 300 to recognize the received voice data 1010.

The refrigerator 200a may transmit voice data Sa to the external server 300 via the AP device 400 and the external network 55. The server 300 may transmit voice data Sb converted into text through voice recognition to the refrigerator 200a via the AP device 400 and the external network 55. The communication unit 222 of the refrigerator 200a may receive the voice data Sb converted into text.

Figure 10C:
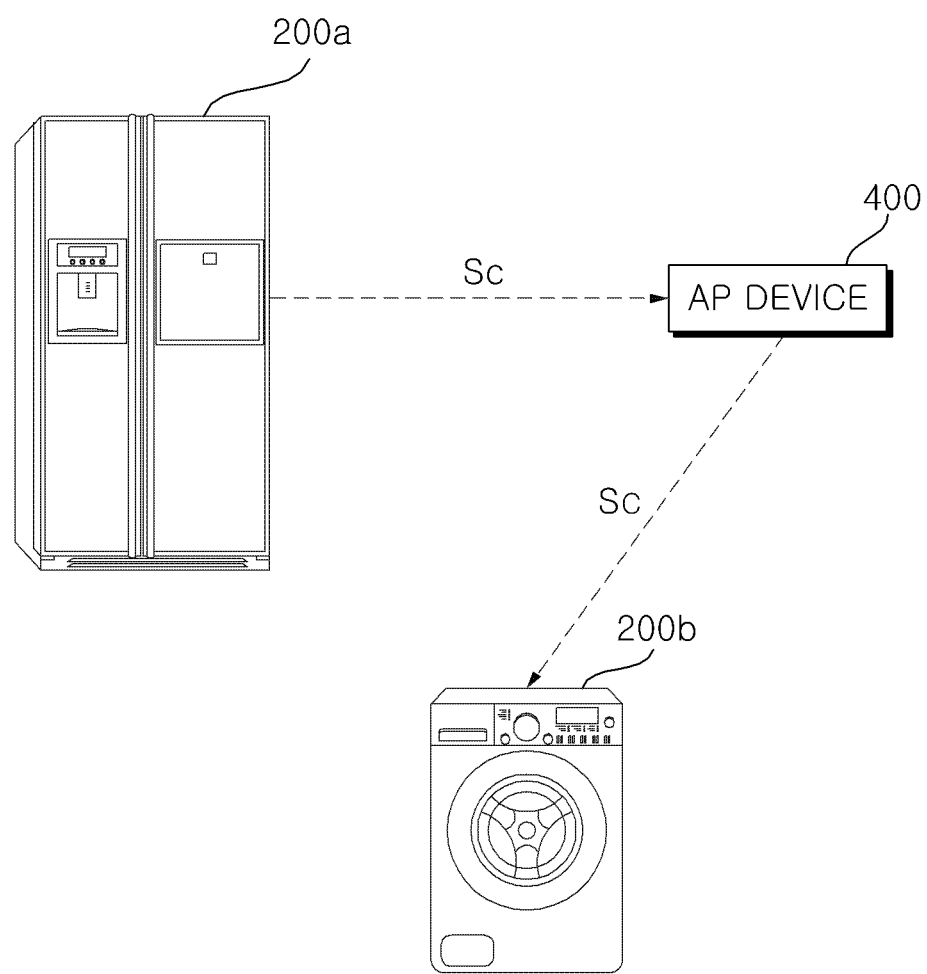

FIG. 10C illustrates that the refrigerator 200a transmits voice data Sc converted into text to the washing machine 200b via the AP device 400. Alternatively, the refrigerator 200a may directly transmit the voice data Sc to the washing machine 200b through one to one communication not via the AP device 400.

Figure 10D:
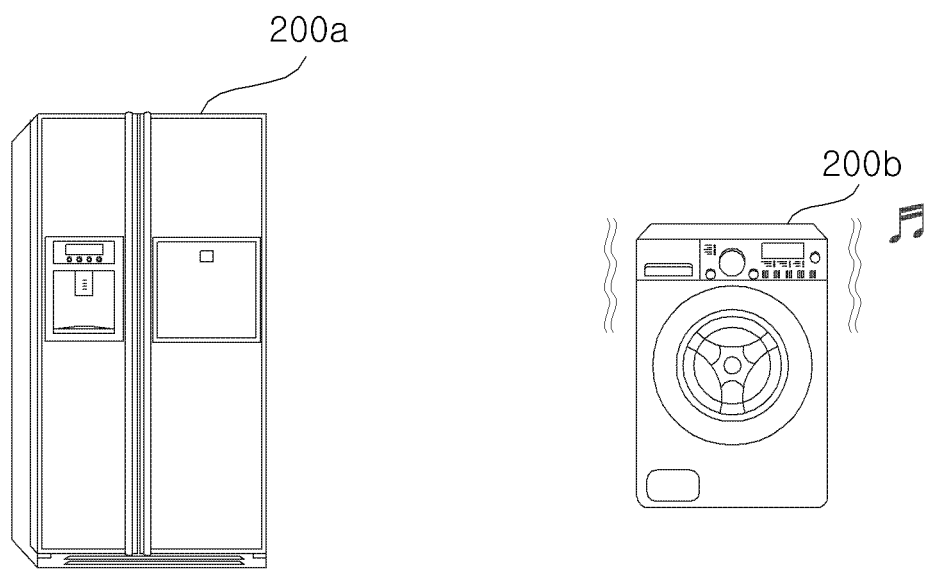

FIG. 10D illustrates that the washing machine 200b is turned on according to the received voice data Sc. At this time, it is possible to output a voice message or a video message indicating turn-on of the washing machine 200b.

FIGS. 11A to 11D illustrate sharing of voice data between the refrigerator 200a and the TV 200f.

Figure 11A:
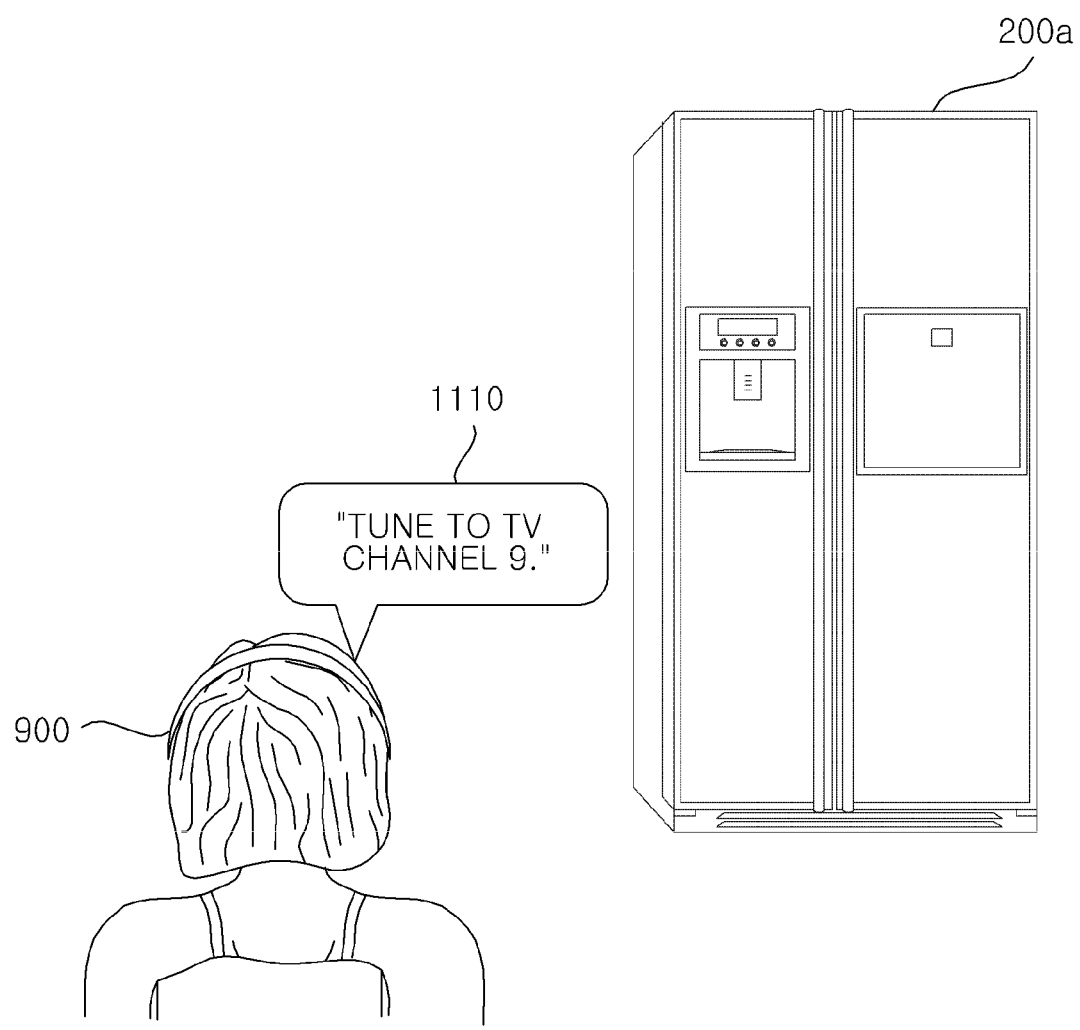

FIG. 11A illustrates that the user 900 inputs a voice data 1110 of "Tune to TV channel 9." to the refrigerator 200a. As a result, the audio input unit 252 of the refrigerator 200a may receive the voice data 1110 and transmit the received voice data 1110 to the controller 270.

Figure 11B:
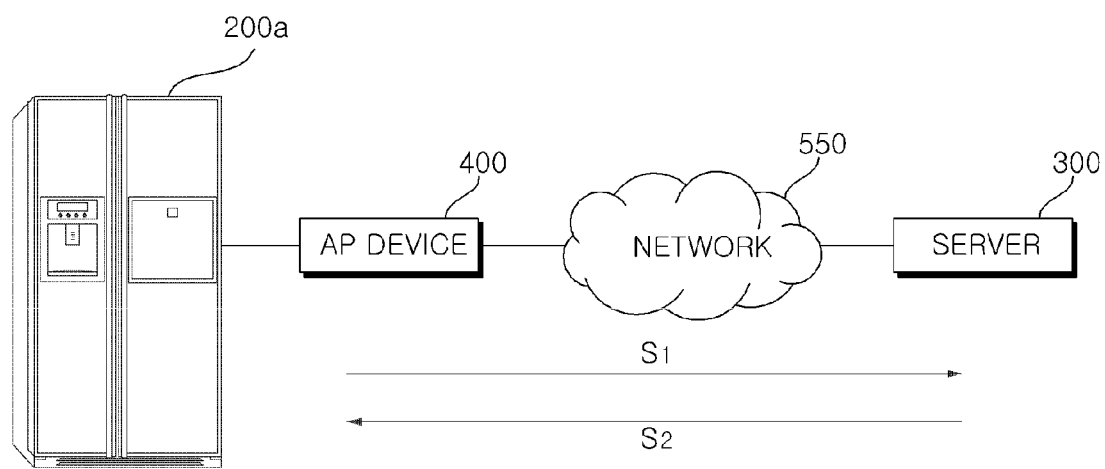

FIG. 11B illustrates that the refrigerator 200a exchanges data with the server 300 to recognize the received voice data 1110.

The refrigerator 200a may transmit voice data S1 to the external server 300 via the AP device 400 and the external network 55. The server 300 may transmit voice data S2, converted into text through voice recognition, to the refrigerator 200a via the AP device 400 and the external network 55. The communication unit 222 of the refrigerator 200a may receive the voice data S2 converted into text.

Figure 11C:
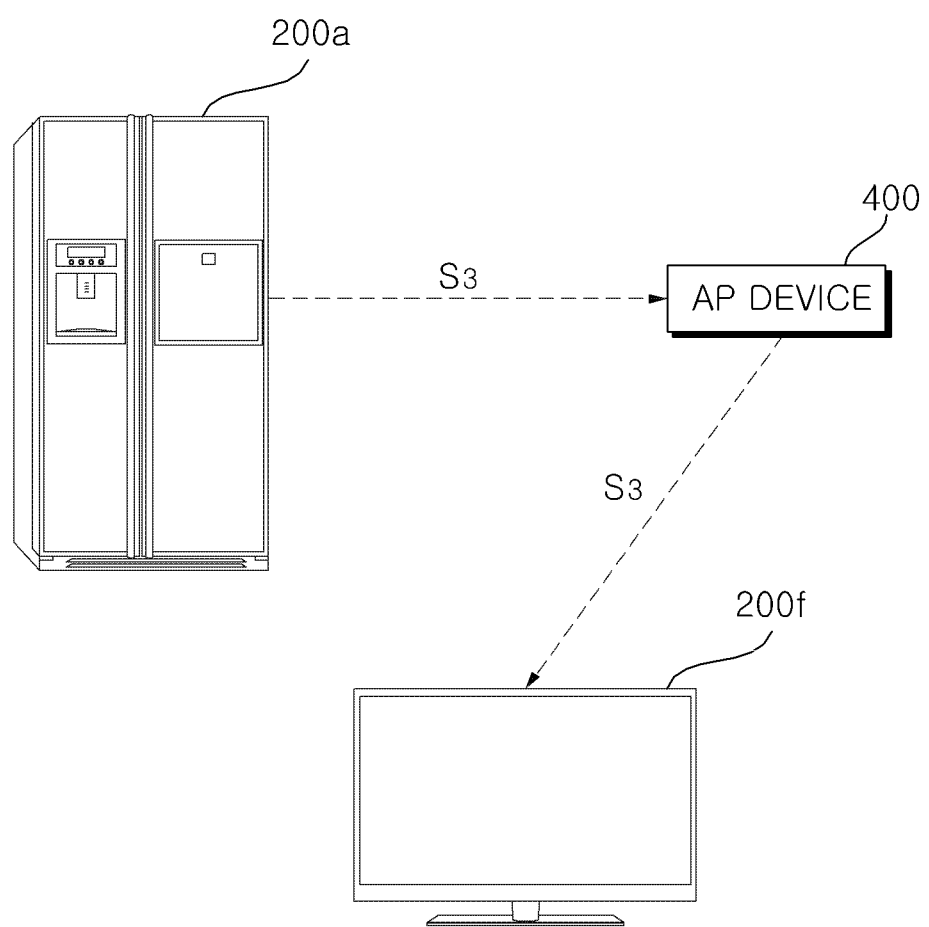

FIG. 11C illustrates that the refrigerator 200a transmits voice data S3 converted into text to the TV 200f via the AP device 400. Alternatively, the refrigerator 200a may directly transmit the voice data S3 to the TV 200f through one to one communication and not via the AP device 400.

Figure 11D:
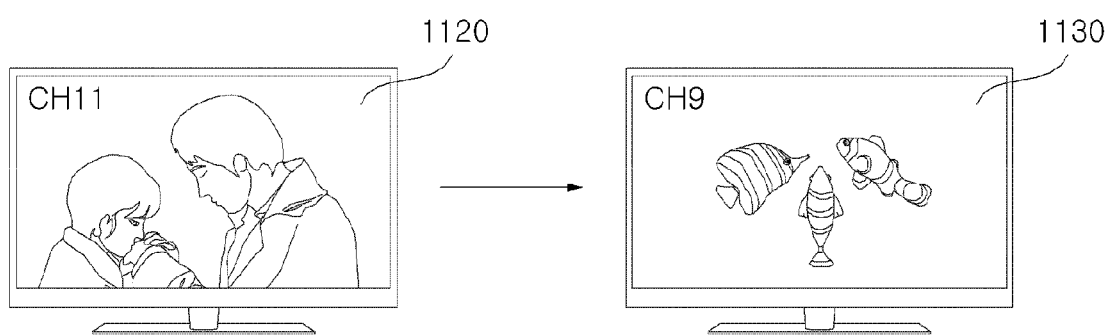

FIG. 11D illustrates that a broadcast video 1120 of CH 11 is switched to a broadcast video 1130 of CH 9 on the TV 200f according to the received voice data S3. Consequently, it is possible for the user located in front of the refrigerator to conveniently perform switching between TV channels.

FIGS. 12A to 12D illustrate sharing of voice data between the refrigerator 200a and the air conditioner 200c.

Figure 12A:
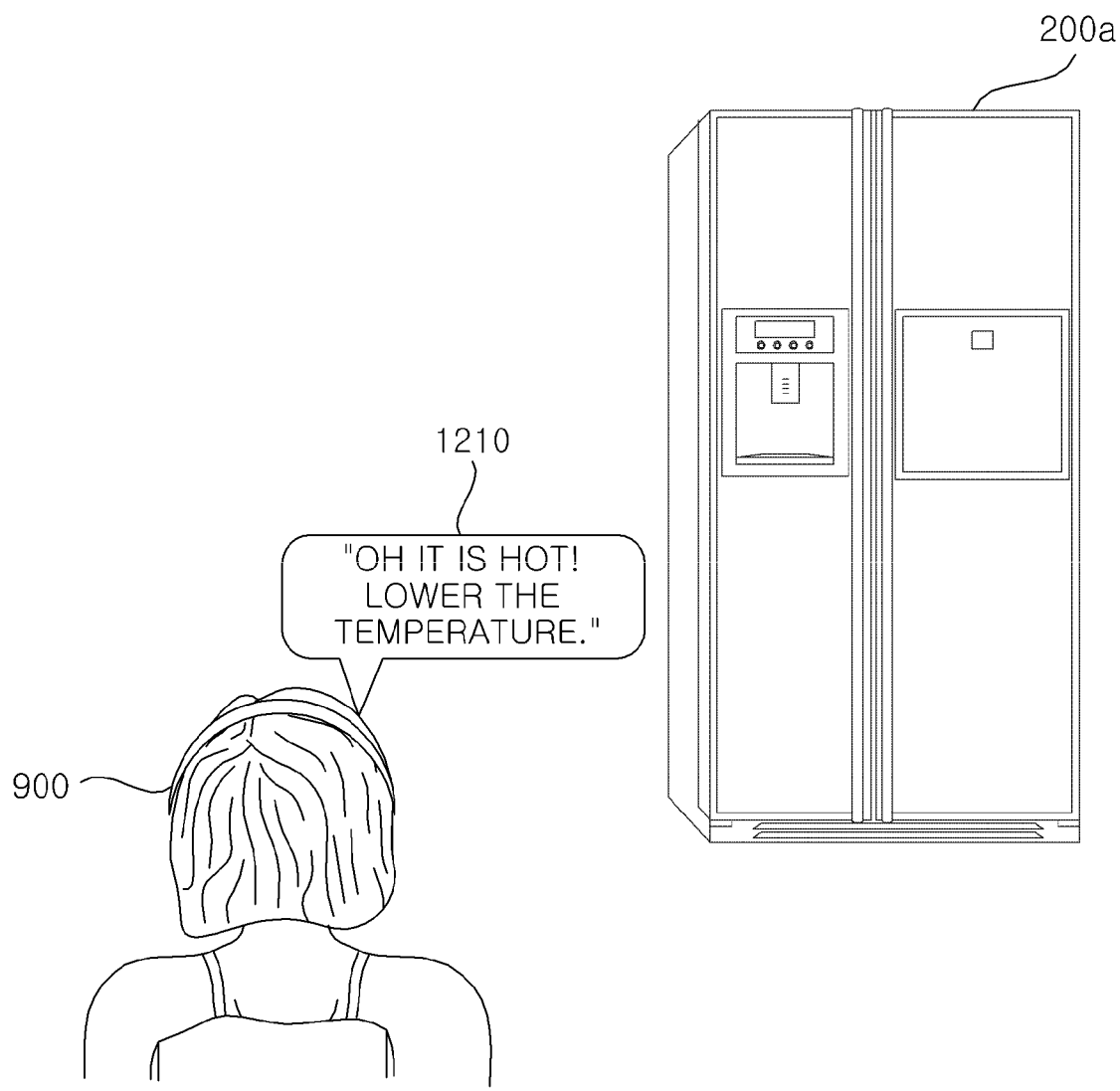

FIG. 12A illustrates that the user 900 inputs a voice data 1210 of "Oh it is hot! Lower the temperature." to the refrigerator 200a. As a result, the audio input unit 252 of the refrigerator 200a may receive the voice data 1210 and transmit the received voice data 1210 to the controller 270.

Figure 12B:
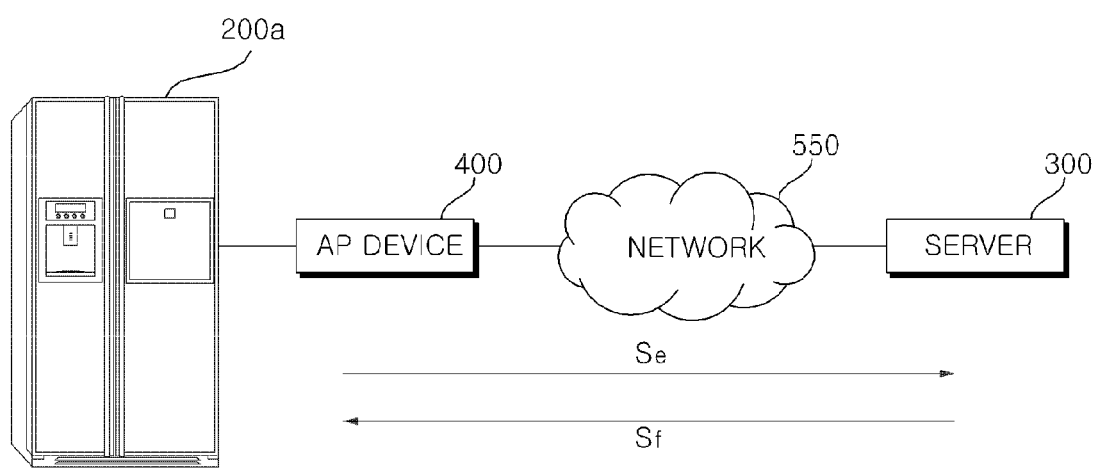

FIG. 12B illustrates that the refrigerator 200a exchanges data with the server 300 to recognize the received voice data 1210.

The refrigerator 200a may transmit voice data Se to the external server 300 via the AP device 400 and the external network 55. The server 300 may transmit voice data Sf converted into text through voice recognition to the refrigerator 200a via the AP device 400 and the external network 55. The communication unit 222 of the refrigerator 200a may receive the voice data Sf converted into text.

Figure 12C:
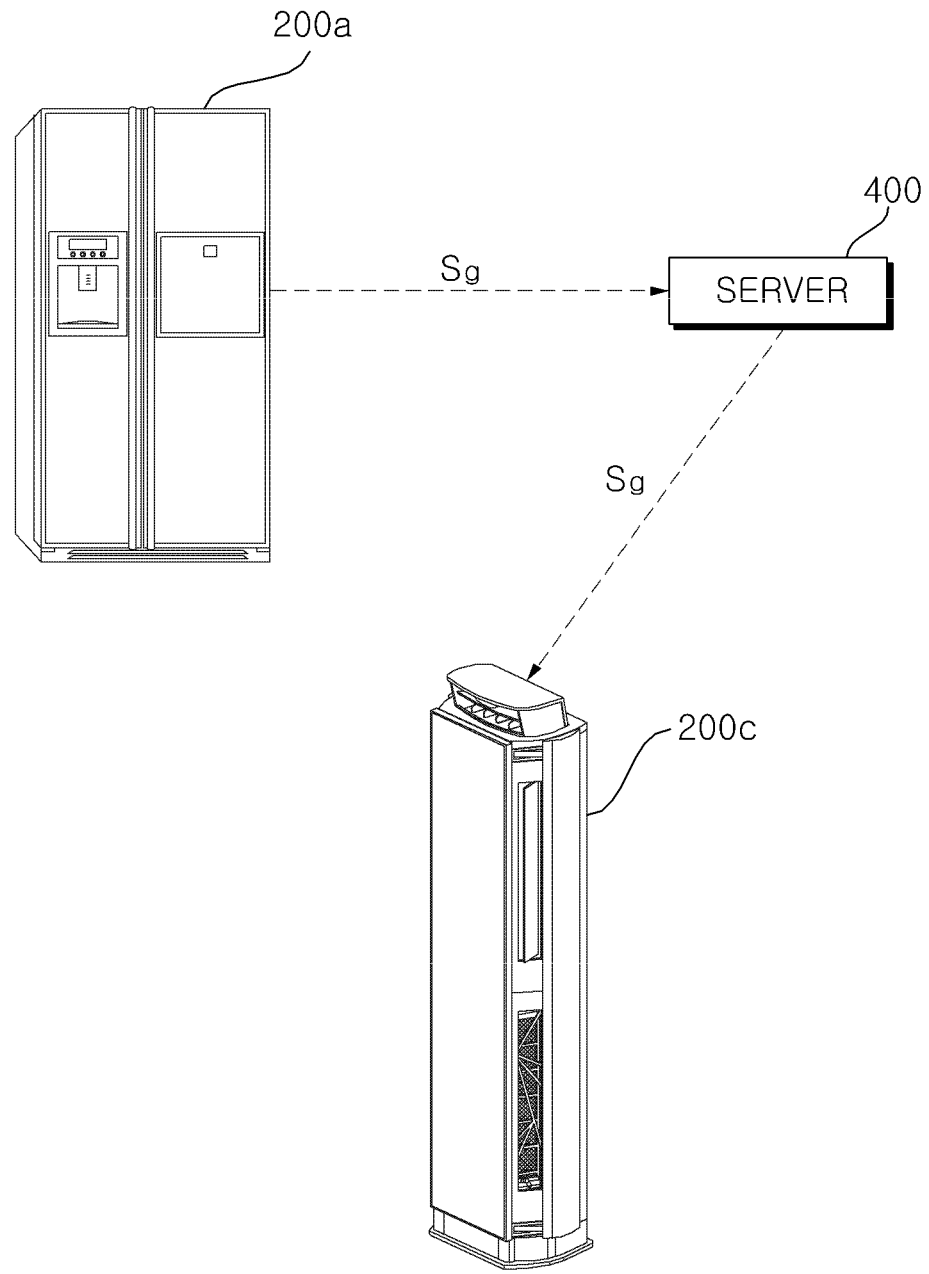

FIG. 12C illustrates that the refrigerator 200a transmits voice data Sg converted into text to the air conditioner 200c via the AP device 400. Alternatively, the refrigerator 200a may directly transmit the voice data Sg to the air conditioner 200c through one to one communication and not via the AP device 400.

Figure 12D:
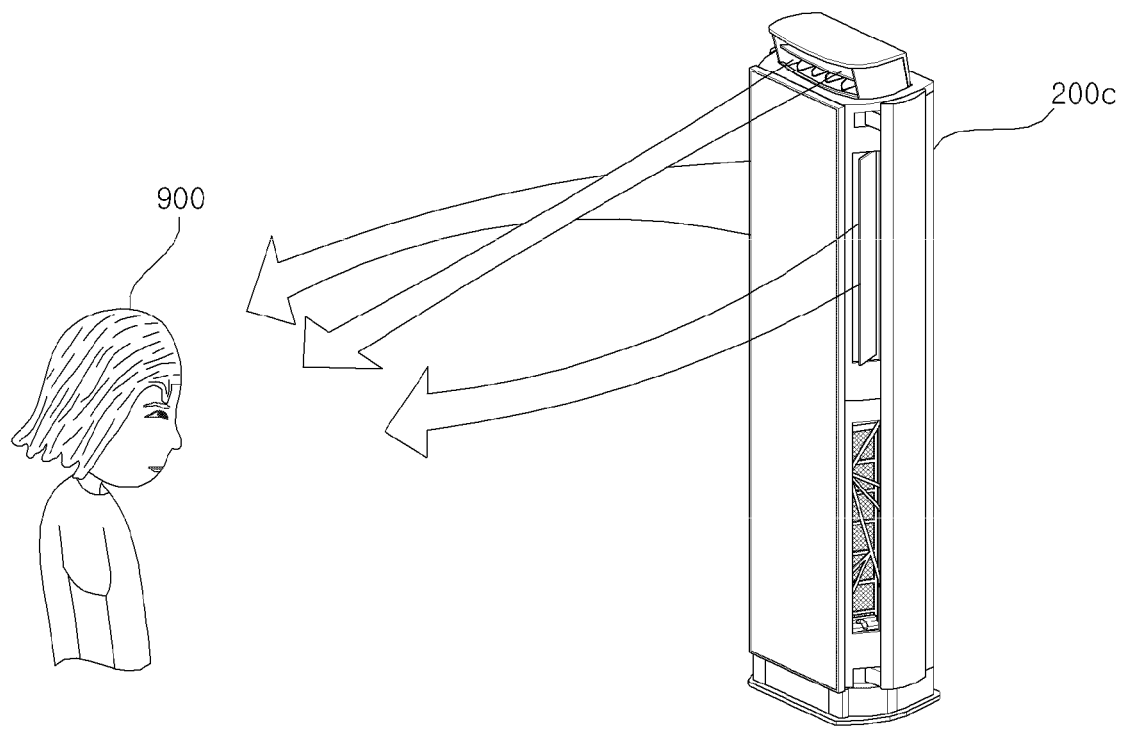

FIG. 12D illustrates that the air conditioner 200c performs a cooling operation to discharge cooled air toward the user according to the received voice data Sg. Consequently, it is possible for the user located in front of the refrigerator to easily and conveniently lower the room temperature.

FIGS. 13A to 13E illustrate sharing of voice data between the cooking device 200d and the TV 200f.

Figure 13A:
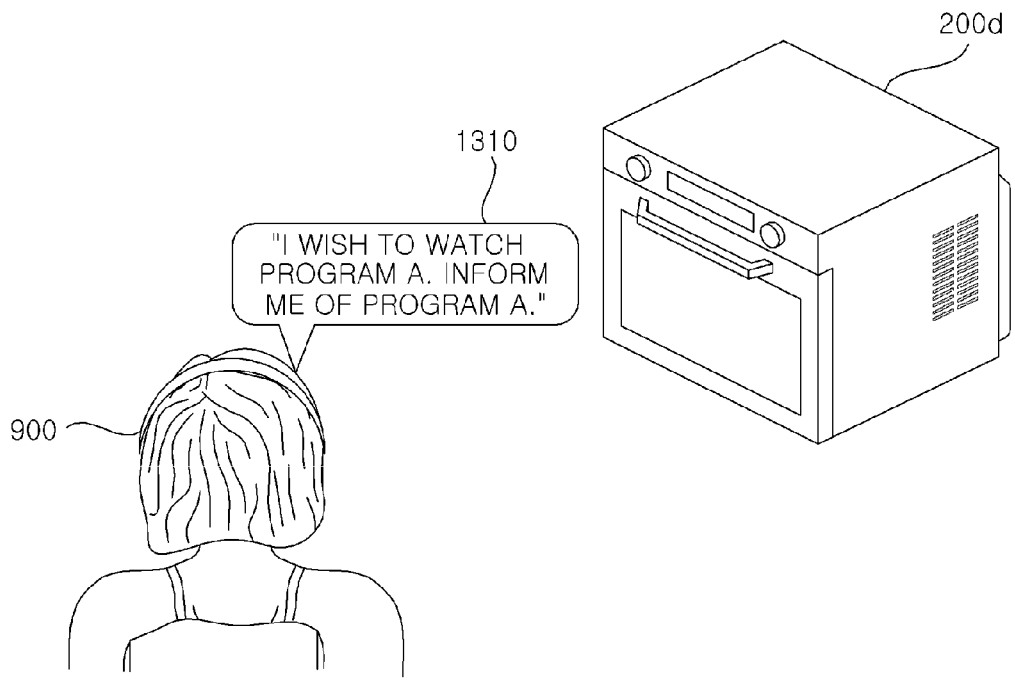

FIG. 13A illustrates that the user 900 inputs a voice 1310 of "I wish to watch program A. Inform me of program A." to the cooking device 200d. As a result, the audio input unit 252 of the cooking device 200d may receive the voice data 1310 and transmit the received voice data 1310 to the controller 270.

Figure 13B:
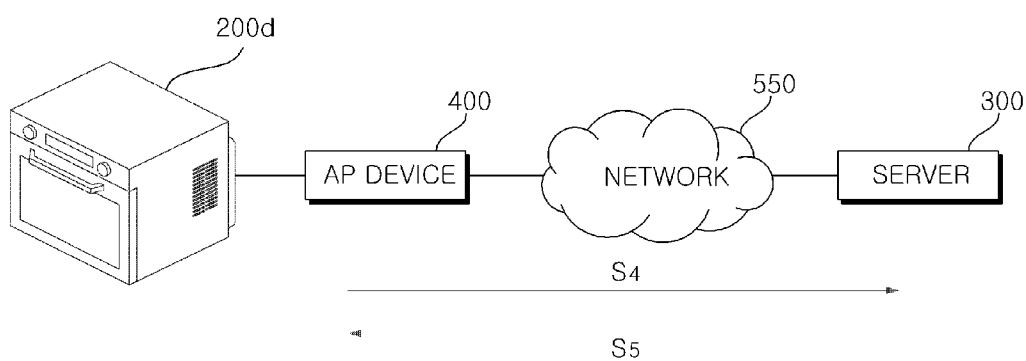

FIG. 13B illustrates that the cooking device 200d exchanges data with the server 300 to recognize the received voice data 1310.

The cooking device 200d may transmit voice data S4 to the external server 300 via the AP device 400 and the external network 55. The server 300 may transmit voice data S5 converted into text through voice recognition to the cooking device 200d via the AP device 400 and the external network 55. The communication unit 222 of the cooking device 200d may receive the voice data S5 converted into text.

Figure 13C:
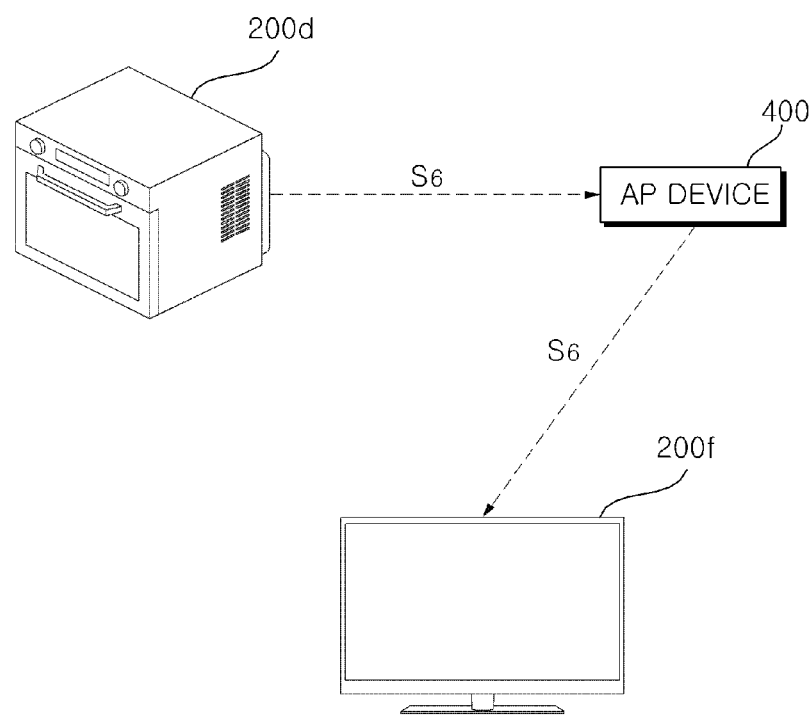

FIG. 13C illustrates that the cooking device 200d transmits voice data S6 converted into text to the TV 200f via the AP device 400. Alternatively, the cooking device 200d may directly transmit the voice data S6 to the TV 200f through one to one communication and not via the AP device 400.

Figure 13D:
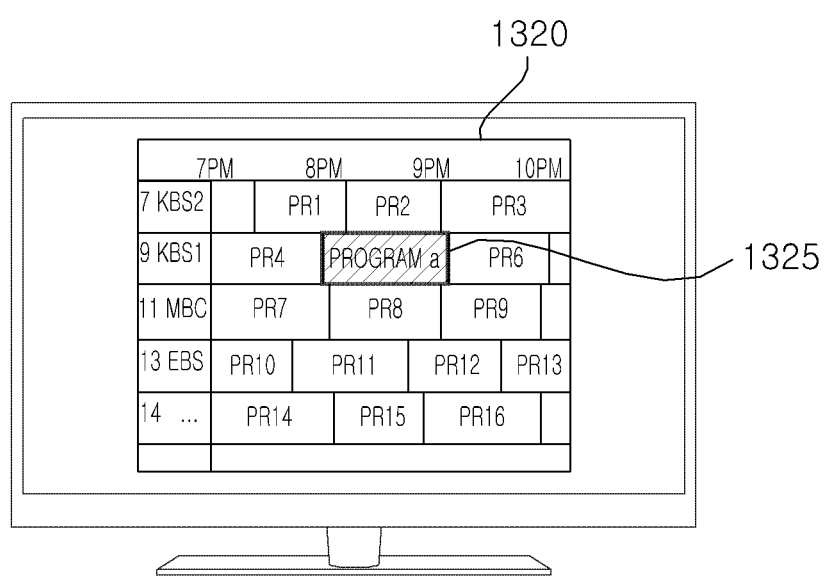

FIG. 13D illustrates that a program guide screen 1320 is displayed on the TV 200f in a state in which a program item 1325 corresponding to program A is highlighted according to the received voice data S6. That is, the controller of the TV 200f may confirm a start time of program A according to the received voice data S6.

In addition, the controller of the TV 200f may control the TV 200f to be turned on or switching between channels to be performed according to the start time of program A.

Figure 13E:
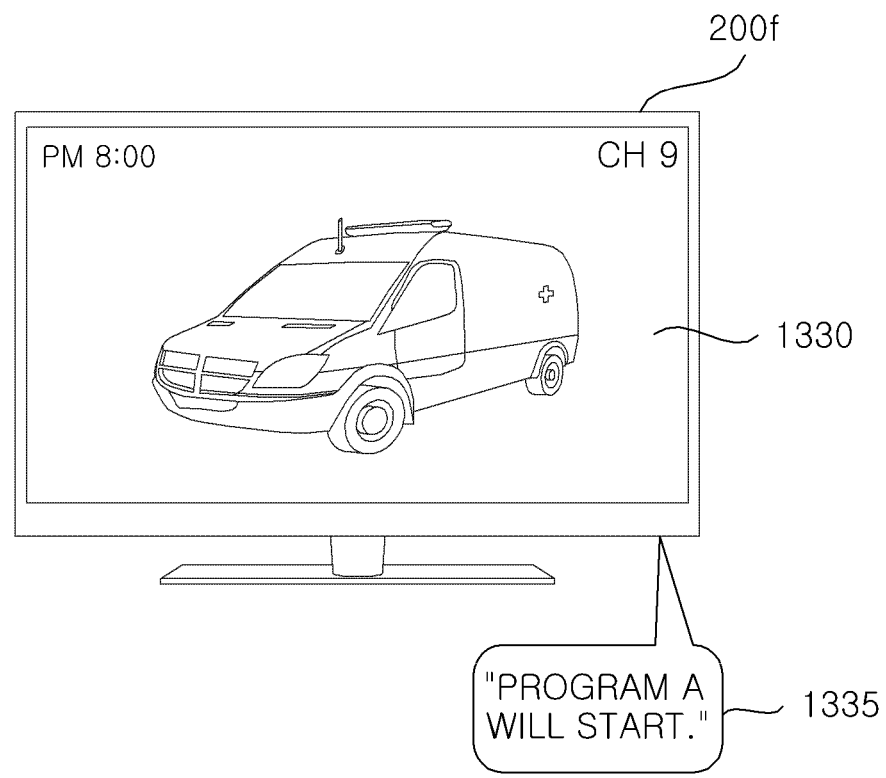
Figure 13E:
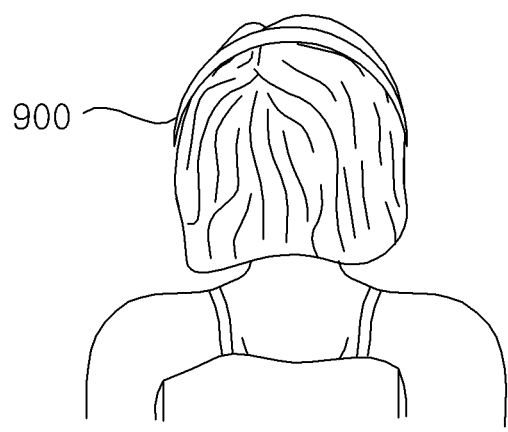

FIG. 13E illustrates that, at the time of starting program A, a corresponding broadcast video 1330 is displayed and a voice message 1335 informing about start of the corresponding program is outputted. Consequently, it is possible for the user located in front of the cooking device 200d to easily and conveniently watch a desired TV program.

Figure 14A:
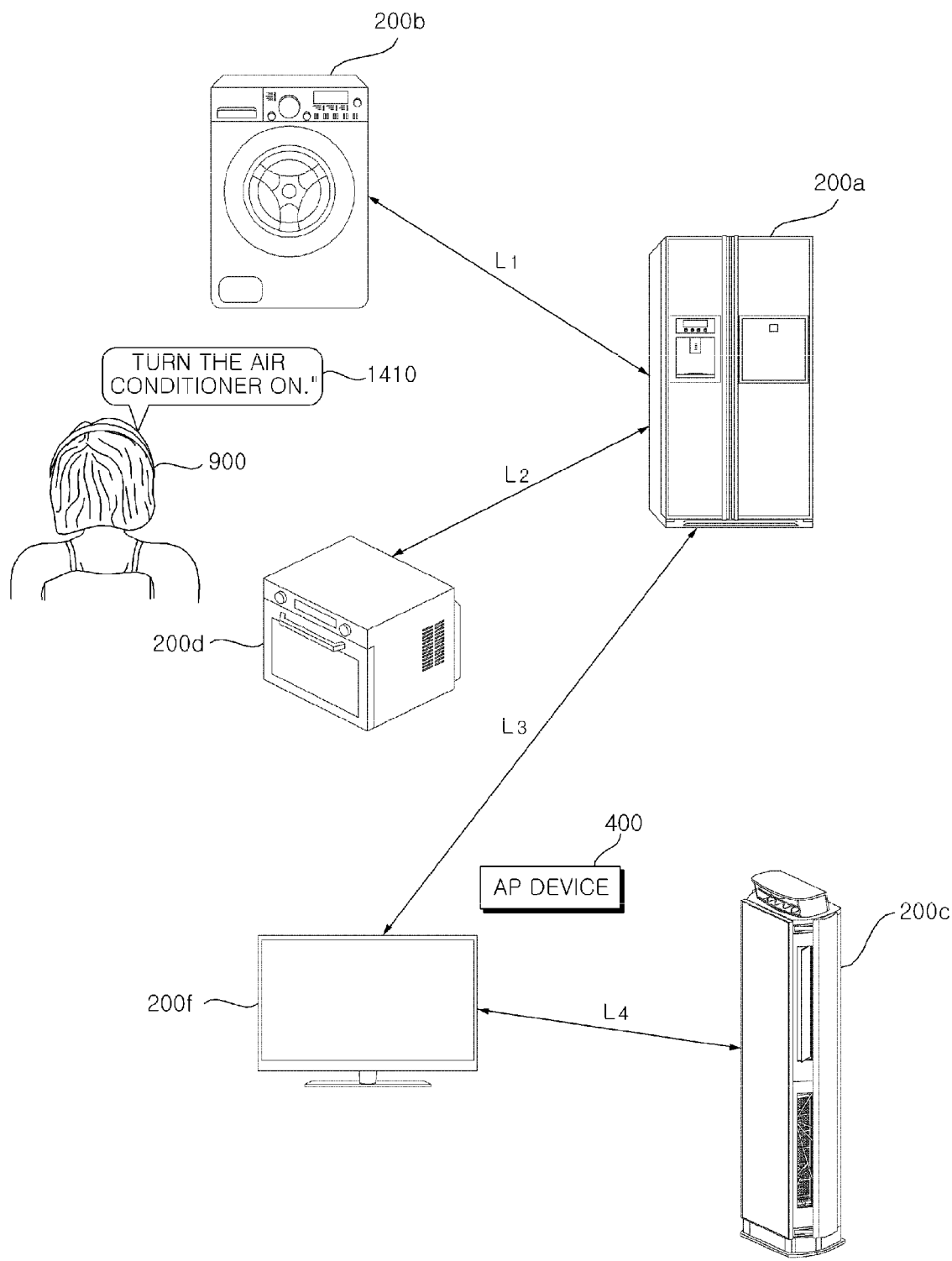
Figure 14B:
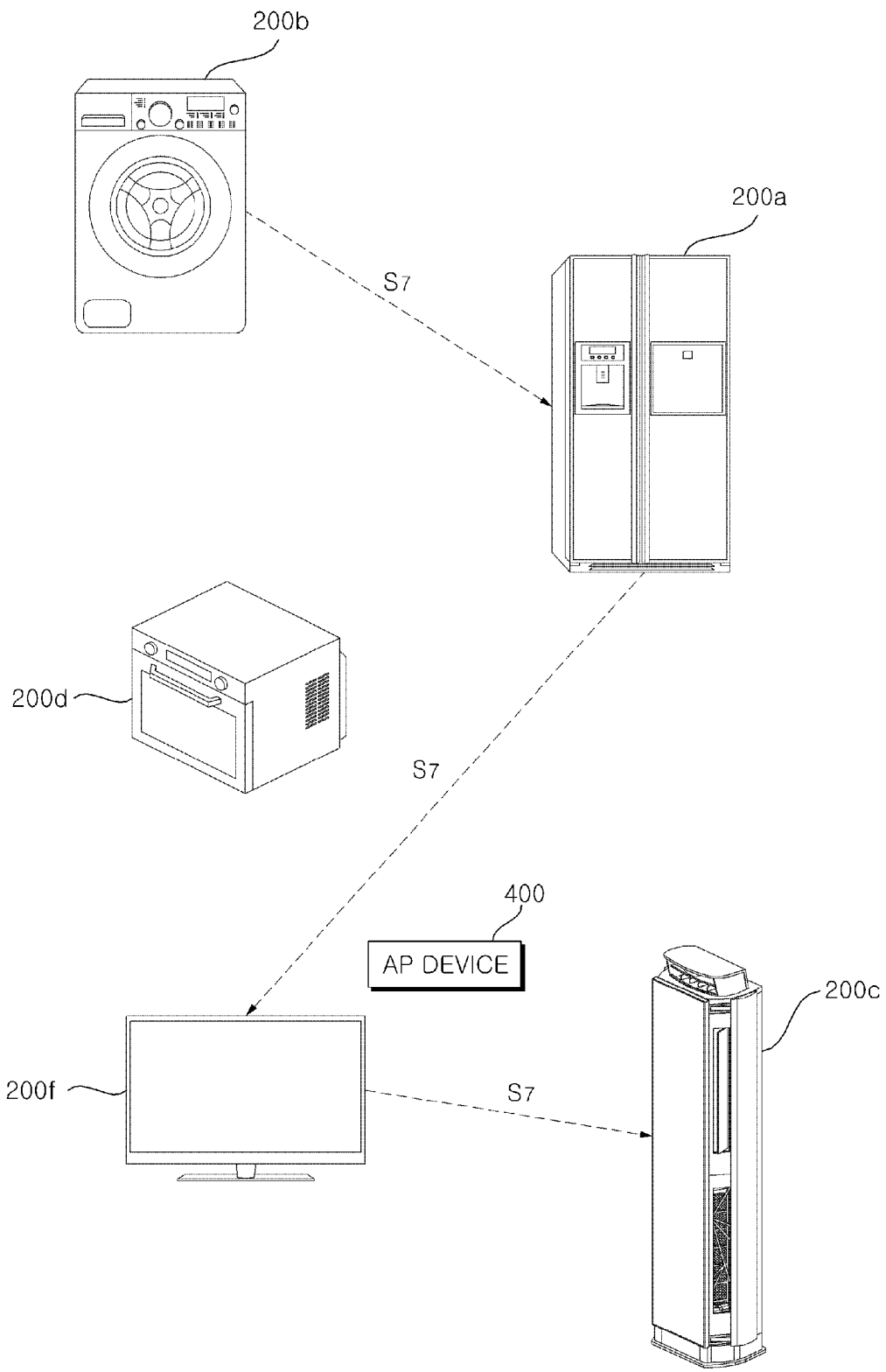
Figure 14C:
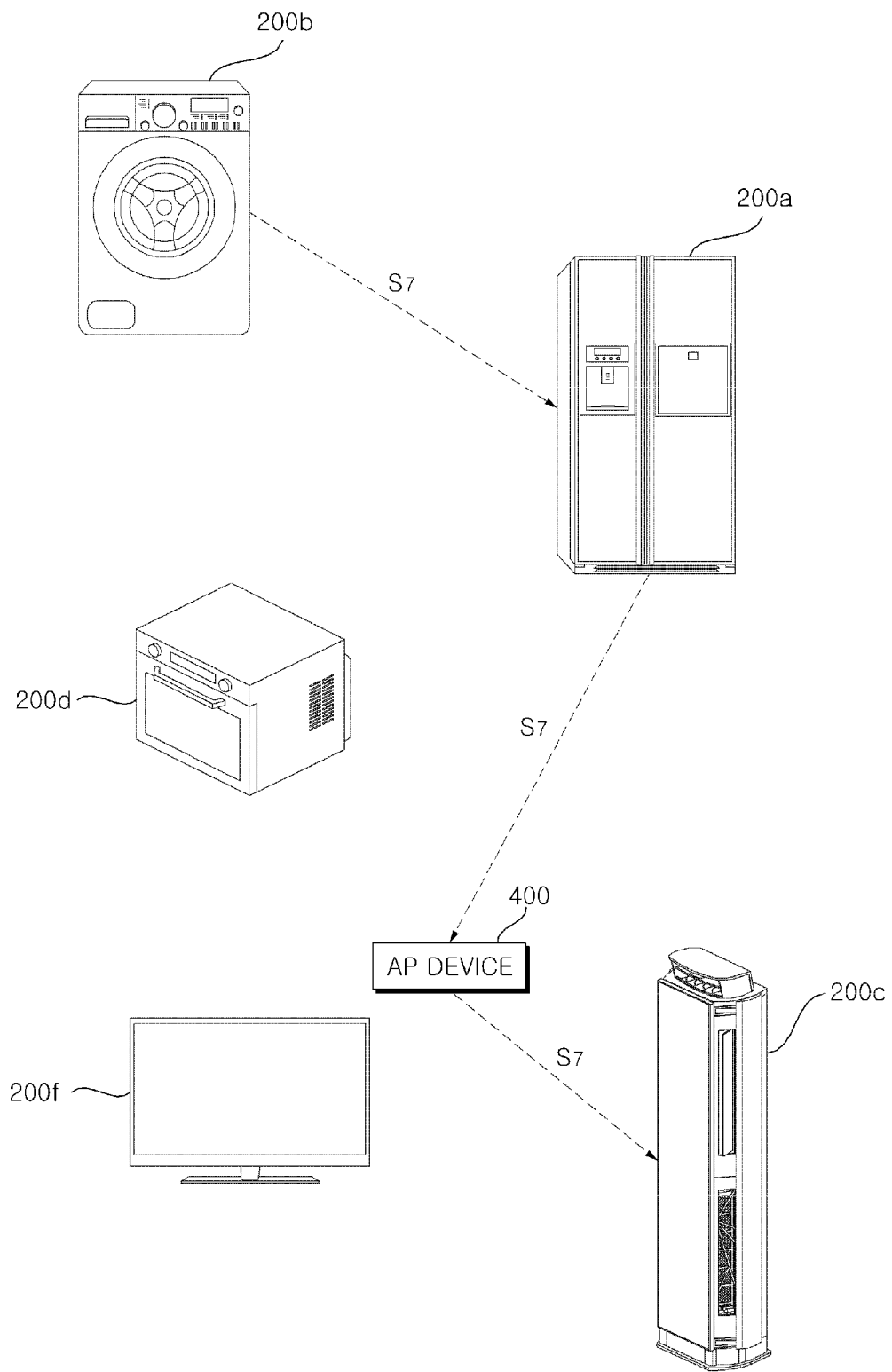

FIGS. 14A to 14C illustrate sharing of voice data between a plurality of home appliances.

FIG. 14A shows an example in which a plurality of home appliances is disposed in a house. Specifically, the washing machine 200b may be disposed in a multipurpose room, the refrigerator 200a and the cooking device 200d may be disposed in a kitchen adjacent to the multipurpose room, the TV 200f and the AP device 400 are disposed in a living room in a state in which the TV 200f and the AP device 400 are adjacent to each other, and the air conditioner 200c may be disposed near a sofa.

The distance between the washing machine 200b and the refrigerator 200a may be L1, the distance between the refrigerator 200a and the cooking device 200d may be L2, the distance between the cooking device 200d and the TV 200f may be L3, and the distance between the TV 200f and the air conditioner 200c may be L4.

In a case in which the user 900 inputs a voice 1410 of "Turn the air conditioner on." to the washing machine 200b, corresponding voice data or voice data converted into text may be transmitted to the air conditioner 200c in various manners.

FIG. 14B illustrates that voice data S7 corresponding to "Turn the air conditioner on." is transmitted to the air conditioner 200c via the refrigerator 200a and the TV 200f, not via the AP device 400. The AP device 400 may cover the entirety of the house. In a remote place of the house, e.g., in a multipurpose room in which the washing machine is disposed, intensity of a signal output from the AP device 400 may be low. For this reason, as shown in FIG. 14B, the voice data may be transmitted to a target home appliance via home appliances adjacent to the target home appliance. Consequently, it is possible to stably transmit the voice data.

FIG. 14C is similar to FIG. 14B. However, FIG. 14C illustrates that voice data S7 corresponding to "Turn the air conditioner on." is transmitted to the air conditioner 200c via the refrigerator 200a and the AP device 400. Since the AP device 400 and the TV 200f are disposed adjacent to each other, transmission via the AP device 400 is possible.

Figure 15:
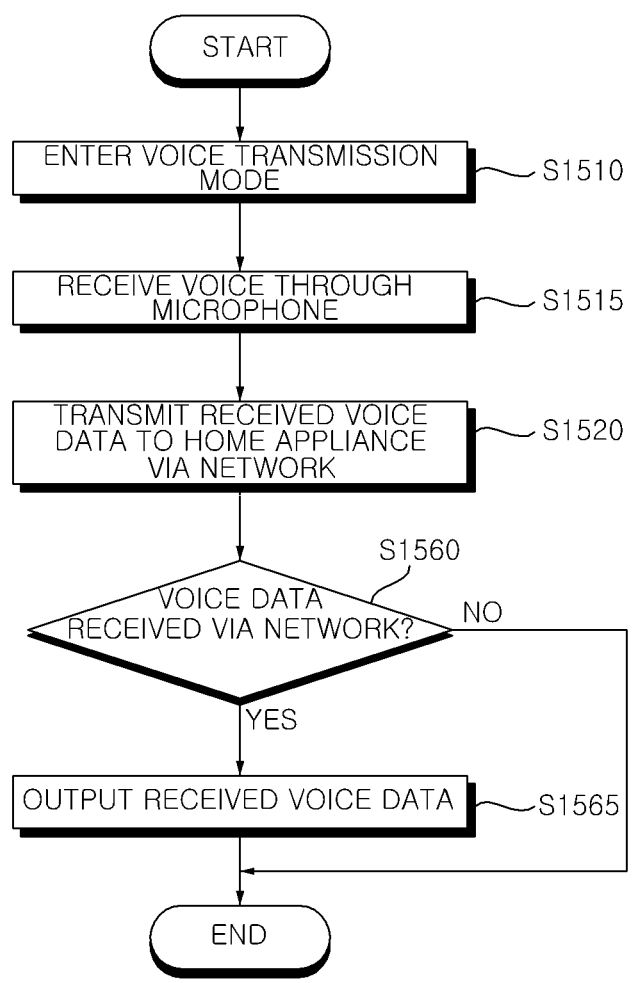
FIG. 15 is a flowchart showing an operation method of a mobile terminal according to another embodiment of the present invention.
Figure 16:
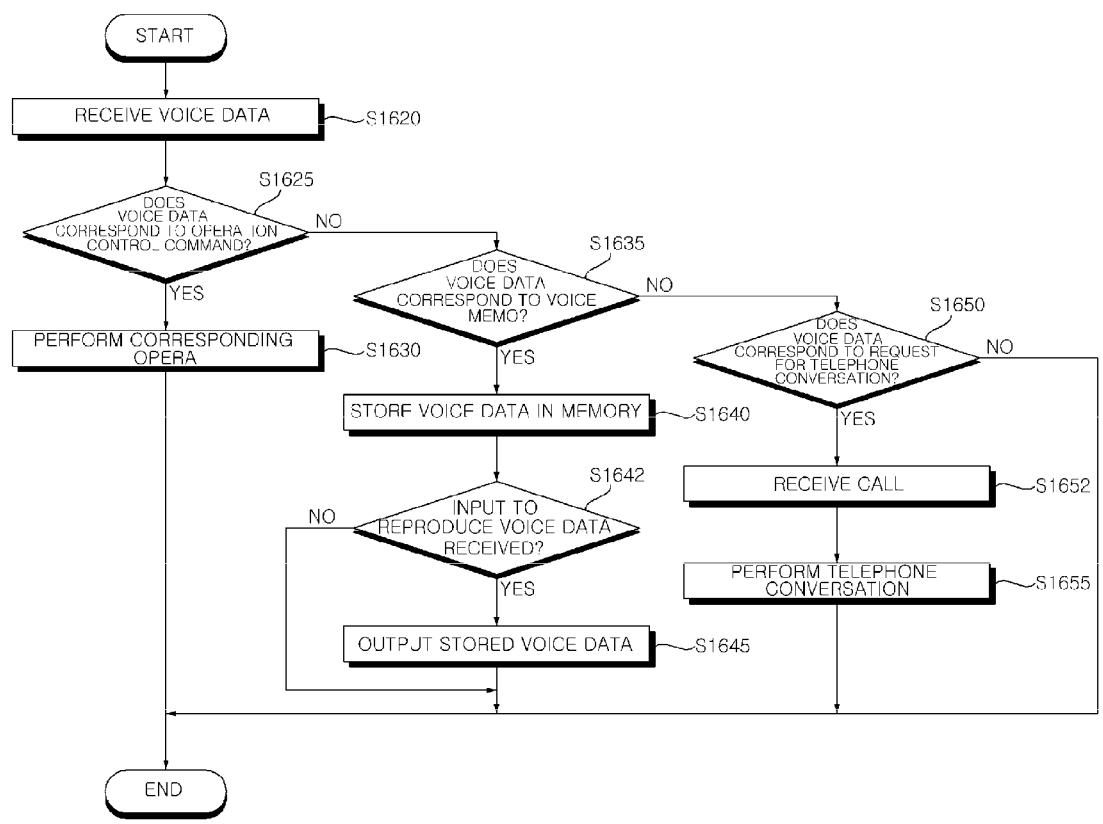
FIG. 16 is a flowchart showing an operation method of a home appliance according to another embodiment of the present invention.
Figure 17:
FIGS. 17 to 20F are reference views illustrating the operation method of FIG. 15 or 16.

FIG. 15 is a flowchart showing an operation method of a mobile terminal according to another embodiment of the present invention, FIG. 16 is a flowchart showing an operation method of a home appliance according to another embodiment of the present invention, and FIGS. 17 to 20F are reference views illustrating the operation method of FIG. 15 or 16.

Referring first to FIG. 15, the mobile terminal 500 may enter a voice transmission mode (S1510). Meanwhile, step S1710 of FIG. 17 corresponds to step S1510 of FIG. 15.

The mobile terminal controller 580 may enter the voice transmission mode according to a user input.

The voice transmission mode may be a mode to transmit a voice input to the mobile terminal 500 to, for example, a home appliance.

Upon entering the voice transmission mode, the mobile terminal controller 580 500 may activate the microphone 523.

Figure 18A:
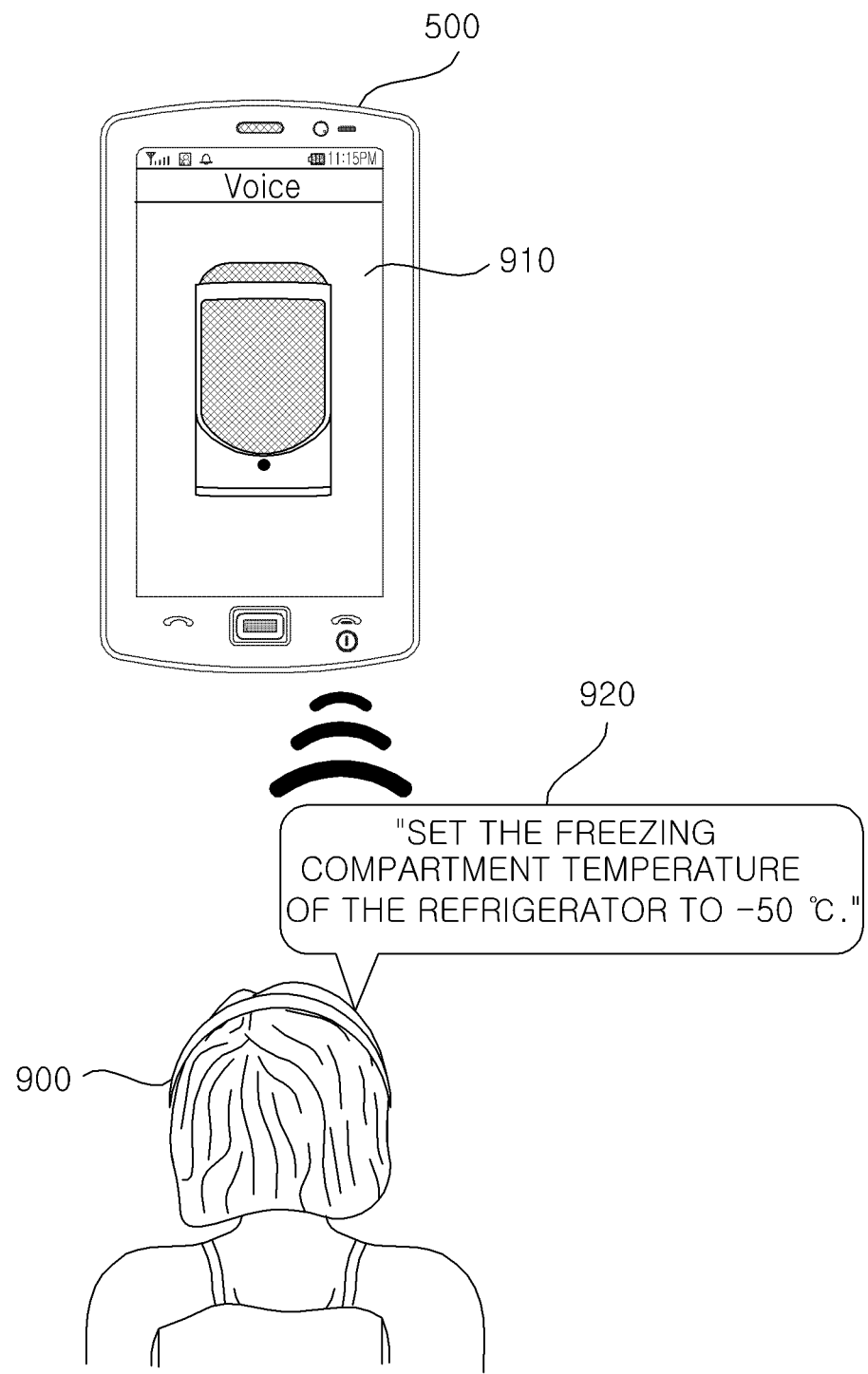

FIG. 18A illustrates that, when the mobile terminal 500 enters the voice transmission mode, a voice recognition screen 910 is displayed on the display unit.

Subsequently, the mobile terminal 500 may receive a voice through the microphone (S1515). Meanwhile, step S1715 of FIG. 17 corresponds to step S1515 of FIG. 15.

Upon receiving a voice input from a user in a state in which the microphone 523 of the mobile terminal 500 is activated, the microphone 523 may receive the voice and transmit the received voice to the controller 580.

FIG. 18A illustrates that the user 900 inputs a voice data 920 of "Set the freezing compartment temperature of the refrigerator to −50° C." to the mobile terminal 500 in a state in which the voice recognition screen 910 is displayed on the mobile terminal 500.

Figure 19A:
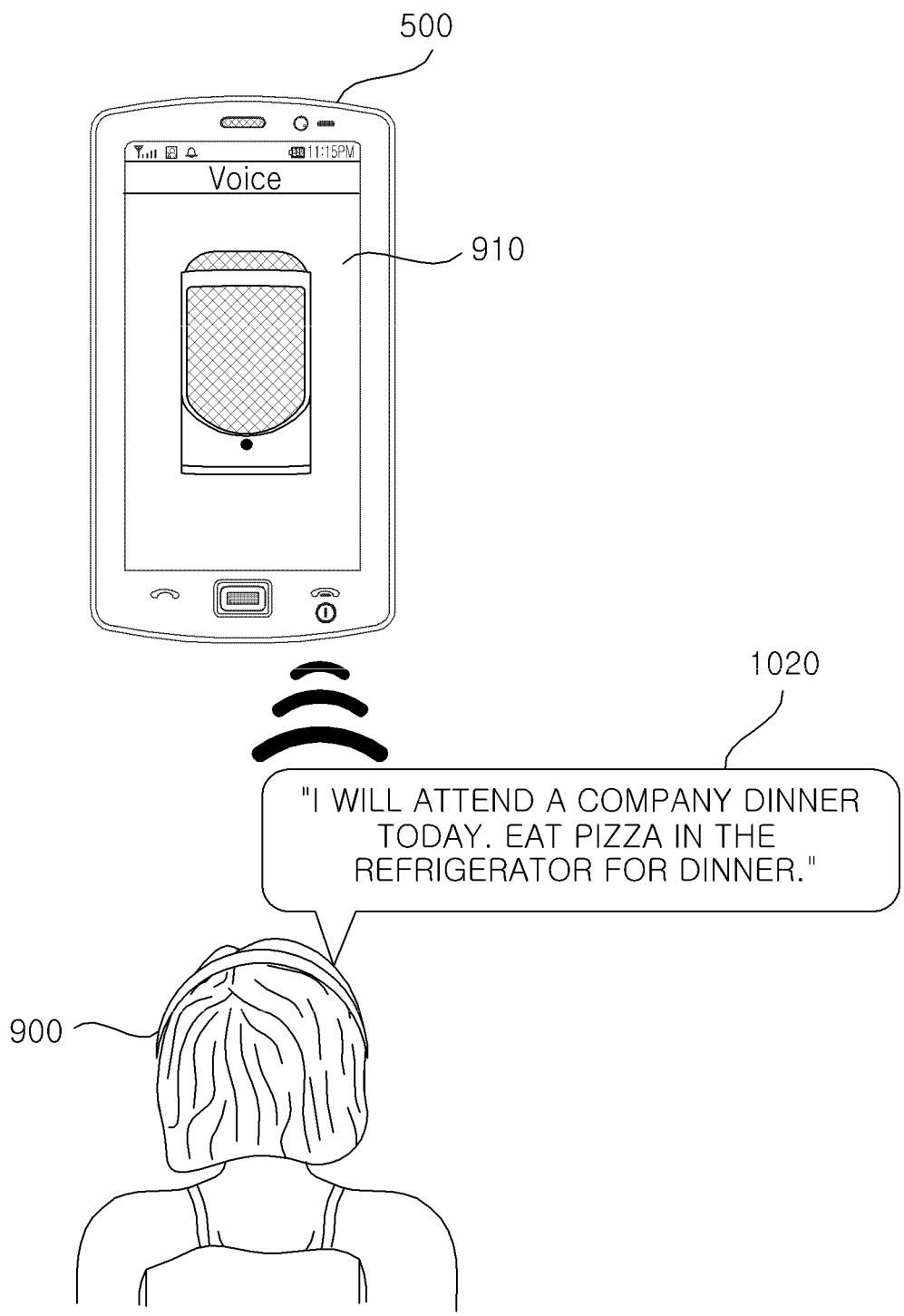

FIG. 19A illustrates that the user 900 inputs a voice data 1020 of "I will attend a company dinner today. Eat pizza in the refrigerator for dinner." to the mobile terminal 500 in a state in which the voice recognition screen 910 is displayed on the mobile terminal 500.

Figure 20A:
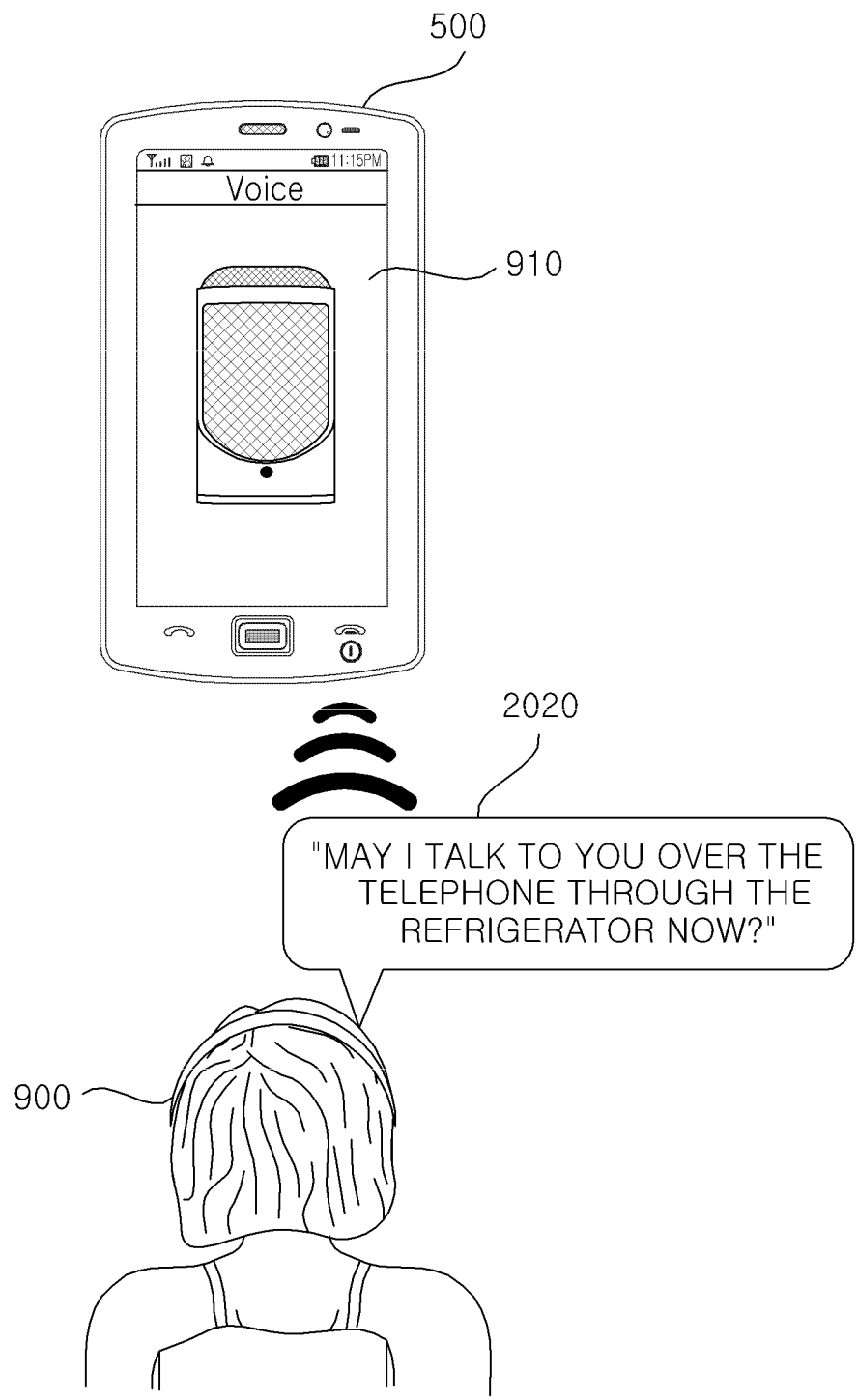

FIG. 20A illustrates that the user 900 inputs a voice data 2020 of "May I talk to you over the telephone through the refrigerator now?" to the mobile terminal 500 in a state in which the voice recognition screen 910 is displayed on the mobile terminal 500.

The mobile terminal controller 580 may perform signal processing with respect to the input voice and perform voice recognition.

For example, in a case in which the mobile terminal memory 560 is provided with a voice recognition algorithm, the mobile terminal controller 580 may recognize the voice data 920 of the user using the voice recognition algorithm. That is, the mobile terminal controller 580 may convert a voice signal into a text signal.

In another example, in a case in which the mobile terminal memory 560 is not provided with a voice recognition algorithm, the mobile terminal controller 580 may access the server 300 using the wireless communication unit 510 and recognize the voice data 920 of the user using the voice recognition algorithm provided in the server 300. That is, the mobile terminal controller 580 may convert a voice signal into a text signal.

Subsequently, the mobile terminal 500 transmits the received voice data to the home appliance 200 via a network (S1520). Meanwhile, step S1720 of FIG. 17 may correspond to step S1520 of FIG. 15 and step S1620 of FIG. 16.

In a case in which the mobile terminal 500 is located in the internal network 10 of FIG. 1, the mobile terminal 500 may access the home appliance 200 via the AP device 400. On the other hand, in a case in which the mobile terminal 500 is located outside the internal network 10 of FIG. 1, the mobile terminal 500 may access the home appliance 200 via the external network 55 and the AP device 400.

Figure 18B:
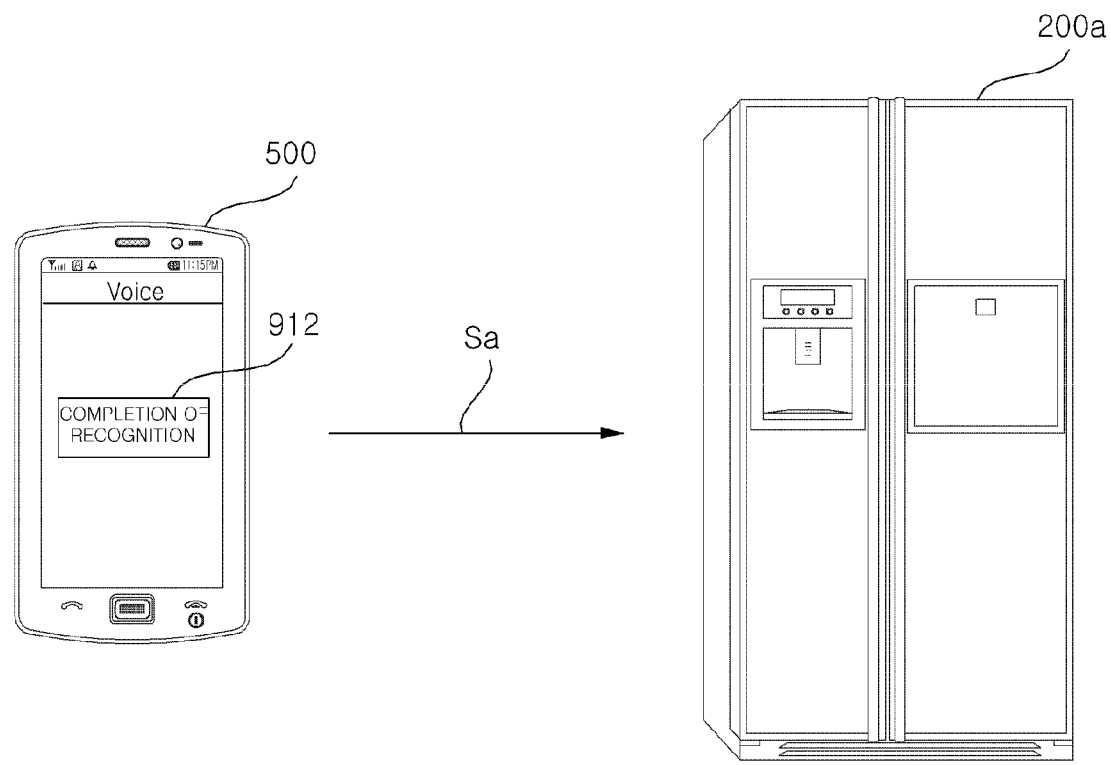

FIG. 18B illustrates that voice data Sa is transmitted from the mobile terminal 500 to the home appliance, specifically the refrigerator 200*a*, in a state in which a message 912 indicating the completion of voice recognition is displayed on the mobile terminal 500.

Figure 19B:
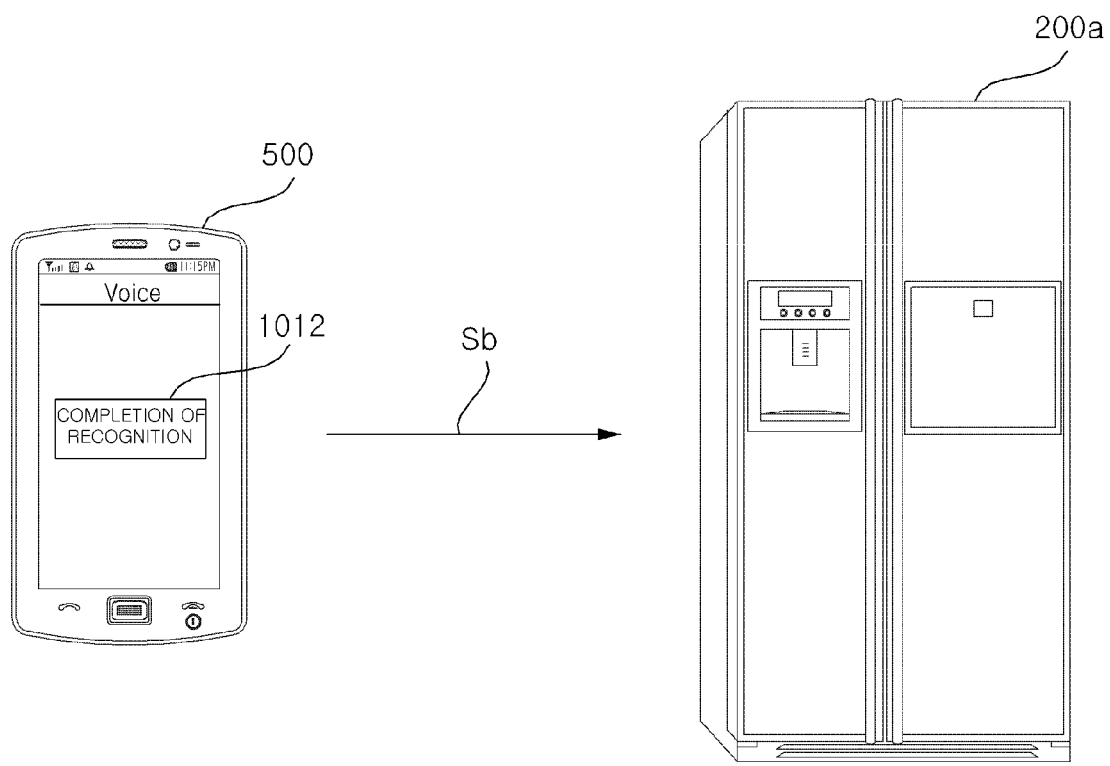

FIG. 19B illustrates that voice data Sb is transmitted from the mobile terminal 500 to the home appliance, specifically the refrigerator 200*a*, in a state in which a message 1012 indicating the completion of voice recognition is displayed on the mobile terminal 500.

Figure 20B:
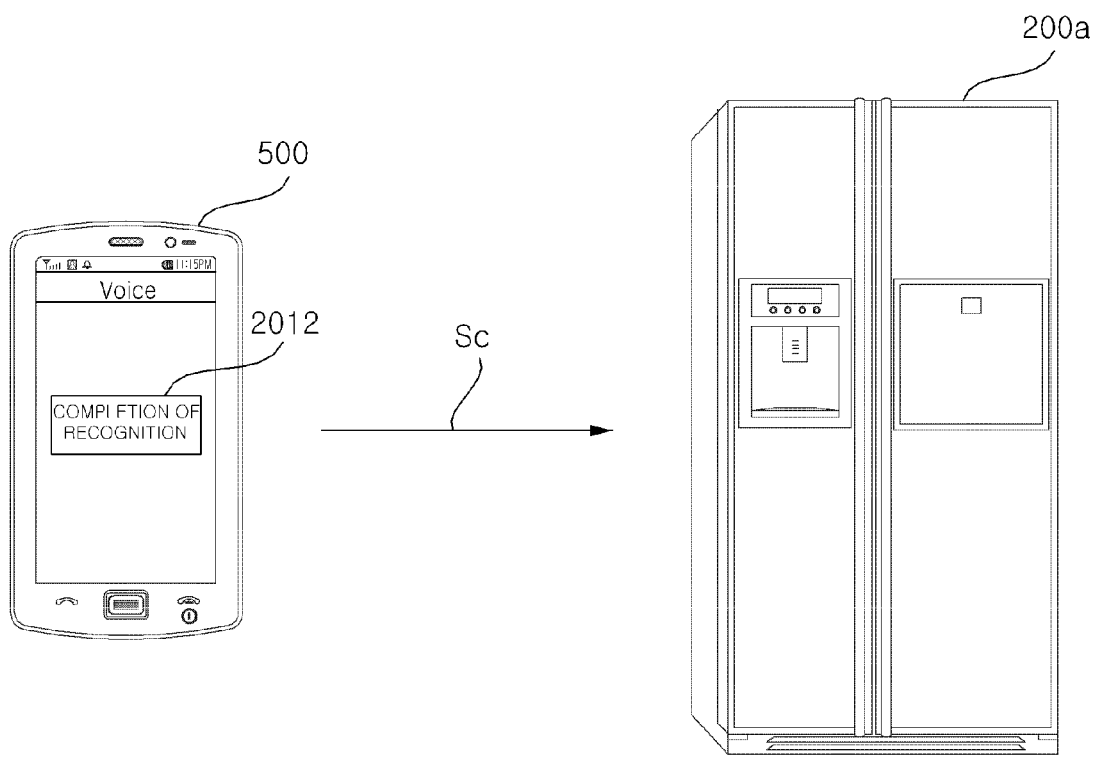

FIG. 20B illustrates that voice data Sc is transmitted from the mobile terminal 500 to the home appliance, specifically the refrigerator 200*a*, in a state in which a message 2012 indicating the completion of voice recognition is displayed on the mobile terminal 500.

Subsequently, the home appliance 200, specifically the refrigerator 200*a*, may determine whether the received voice data is an operation control command (S1625). Upon determining that the received voice data is the operation control command, the home appliance 200, specifically the refrigerator 200*a*, is controlled to perform an operation according to the operation control command (S1630). Meanwhile, steps S1725 and S1730 of FIG. 17 may correspond to steps S1625 and S1630 of FIG. 16, respectively.

Consequently, the controller 270 of the home appliance 200, specifically the refrigerator 200*a*, may control the compressor to be driven such that the temperature of the freezing compartment is lowered based on the voice data of "Set the freezing compartment temperature of the refrigerator to −50 t." As a result, the user may easily and conveniently control the home appliance.

Subsequently, upon determining at step S1625 that the received voice data is not the operation control command, step S1635 and the following steps may be performed.

That is, the home appliance 200, specifically the refrigerator 200*a*, may determine whether the received voice data is a voice memo (S1635). Upon determining that the received voice data is the voice memo, the home appliance 200, specifically the refrigerator 200*a*, stores the voice memo in the memory 560 (S1640). Upon receiving a reproduction input (S1642), the home appliance 200, specifically the refrigerator 200*a*, reproduces and outputs the stored voice memo (S1645). Meanwhile, steps S1735, S1740, S1742, and S1745 of FIG. 17 may correspond to steps S1635, S1640, S1642, and S1645 of FIG. 16, respectively.

Consequently, the controller 270 of the home appliance 200, specifically the refrigerator 200*a*, may control the received voice data to be stored in the memory 560 based on the voice data of "I will attend a company dinner today. Eat pizza in the refrigerator for dinner."

Meanwhile, upon receiving the voice memo, the controller of the home appliance 200, specifically the refrigerator 200*a*, may control a message indicating the reception of the voice memo to be output.

Figure 19C:
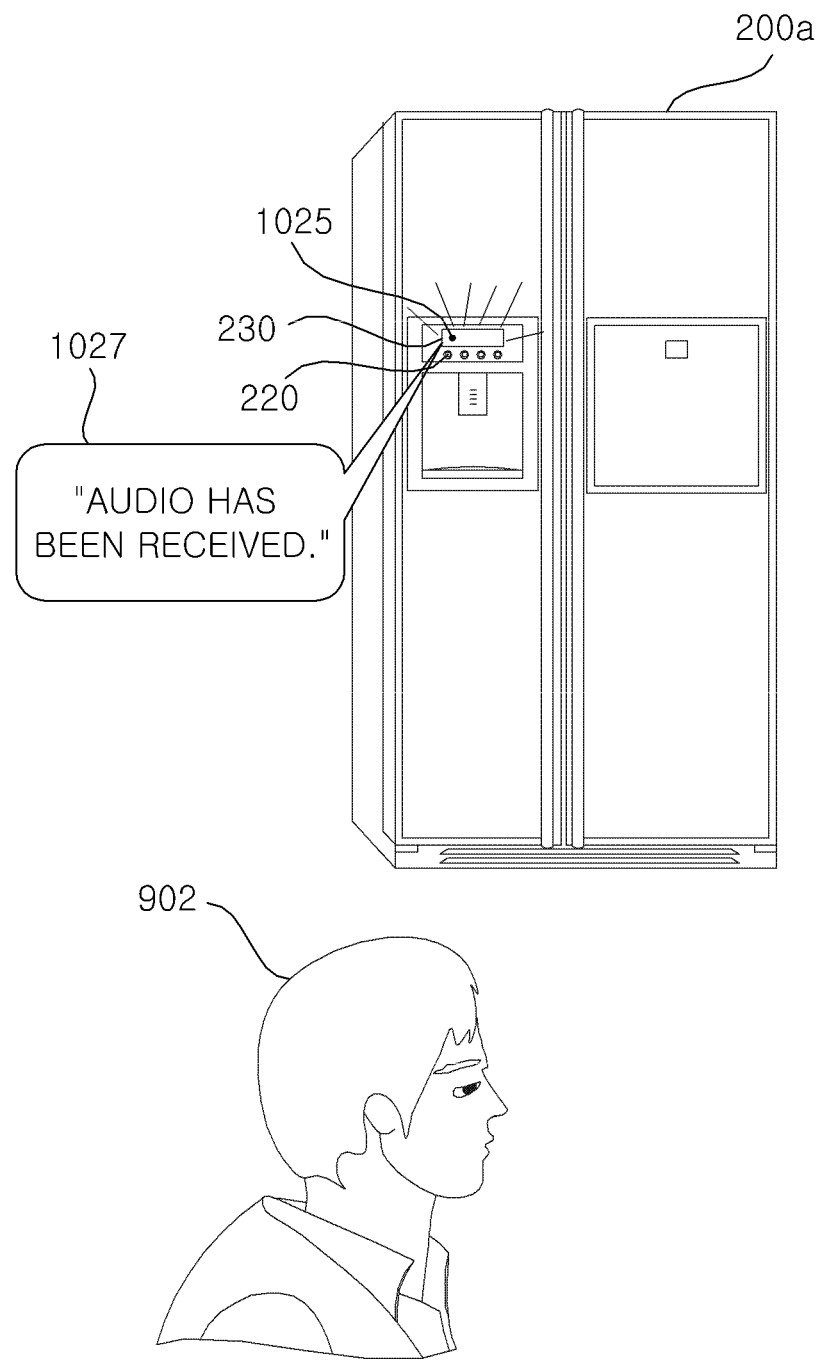

FIG. 19C illustrates that, upon receiving the voice data Sb related to the voice memo, the audio output unit 254 outputs a voice message 1027 of "Audio has been received." In addition, the display unit 230 may output a message 1025 indicating the reception of the voice memo. Furthermore, luminance may be changed or a specific letter may be displayed. As a result, a user 902 may intuitively recognize the reception of the voice memo.

Figure 19D:
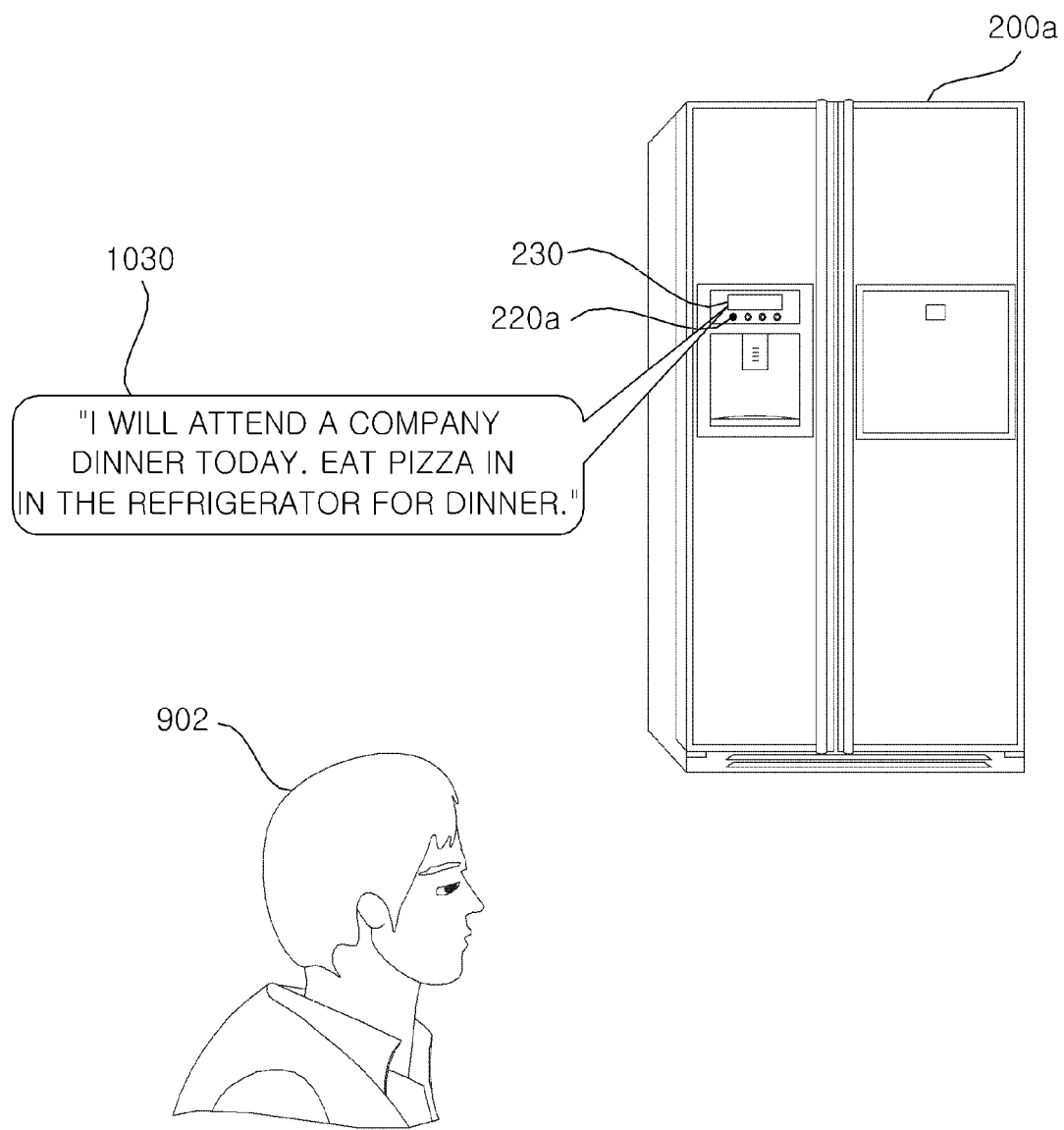

When the user 902 pushes a specific button 220*a* in the input unit 220 of the refrigerator 200*a*, a voice memo 1030 stored in the memory may be output as shown in FIG. 19D.

Subsequently, upon determining at step S1635 that the received voice data is not the voice memo, step S1650 and the following steps may be performed.

That is, the home appliance 200, specifically the refrigerator 200*a*, may determine whether the received voice data is a request for telephone conversation (S1650). Upon determining that the received voice data is a request for telephone conversation, the home appliance 200, specifically the refrigerator 200*a*, receives a call (S1652) and then performs telephone conversation (S1655). Meanwhile, steps S1750, S1752, and S1755 of FIG. 17 may correspond to steps S1650, S1652, and S1655 of FIG. 16, respectively.

Consequently, the controller of the home appliance 200, specifically the refrigerator 200*a*, may receive a call related to the voice data of "May I talk to you over the telephone through the refrigerator now?" and transmit a call access signal to the mobile terminal. In addition, the controller of the home appliance 200, specifically the refrigerator 200*a*, may control the telephone conversation to be performed.

Figure 20C:
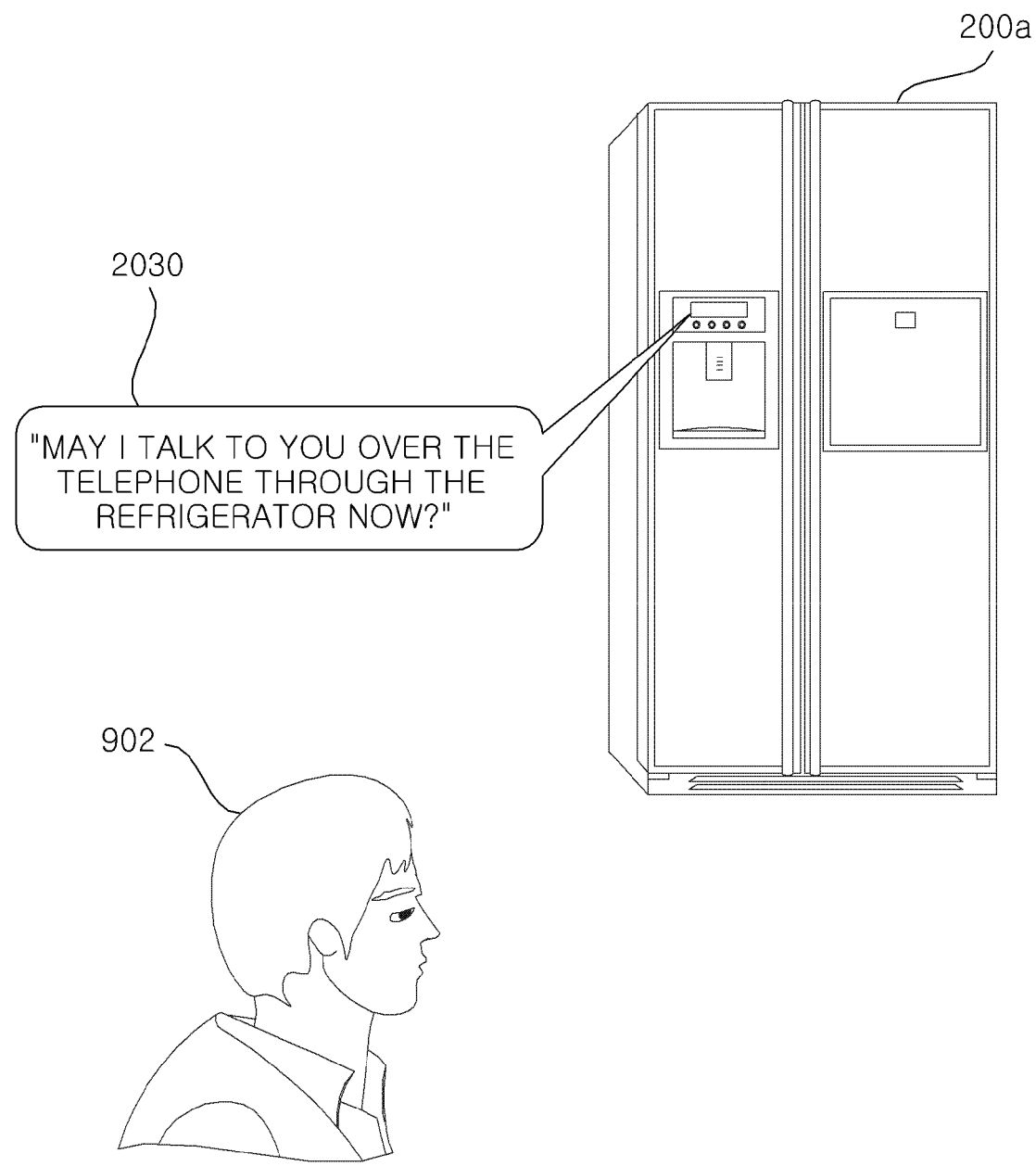

FIG. 20C illustrates that the audio output unit 254 of the refrigerator 200*a* outputs a message 2030 of "May I talk to you over the telephone through the refrigerator now?" according to the reception of the call and the reception of the voice data.

In a case in which the user 902 inputs a voice data 2040 of "Yeah, what's up?" while pushing the specific button 220*a* in the input unit 220 of the refrigerator 200*a* as shown in FIG. 20D, the audio input unit 252 of the refrigerator 200*a* may receive the voice data 2040 and transmit the received voice 2040 to the controller 270.

The controller 270 of the refrigerator 200*a* may perform signal processing with respect to the voice data received through the audio input unit 252 and control the signal-processed voice data to be transmitted to the mobile terminal 500.

Figure 20E:
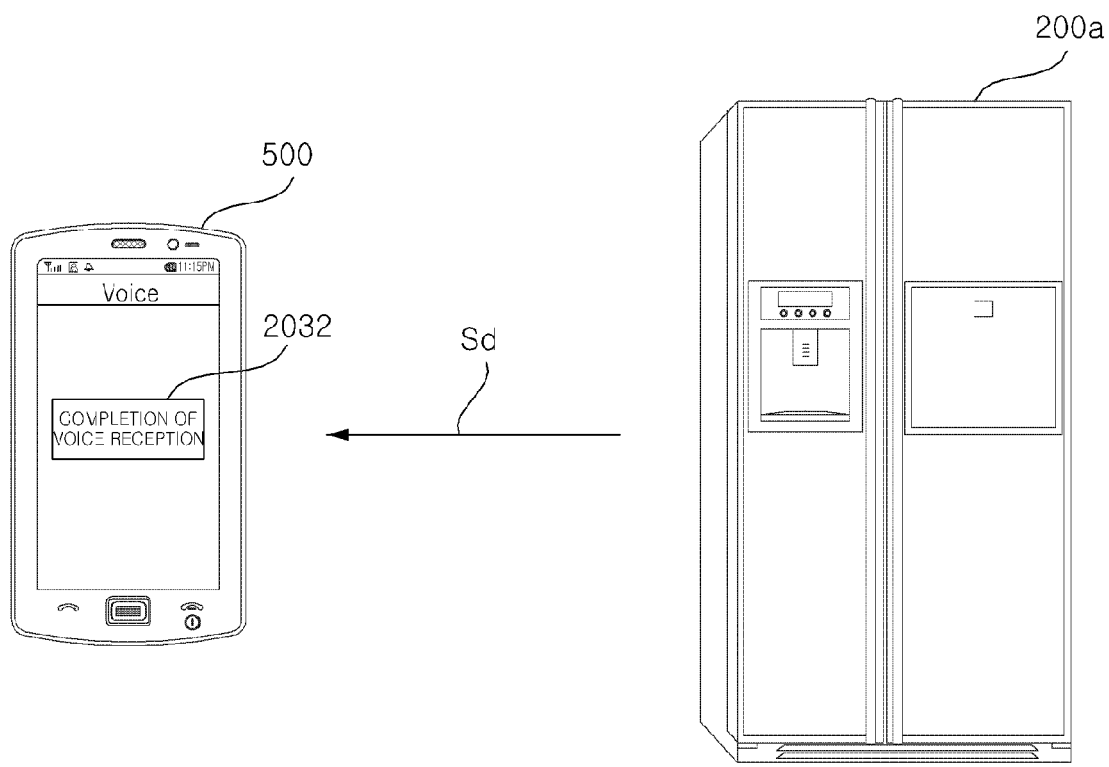

FIG. 20E illustrates that voice data Sd is transmitted from the refrigerator 200a to the mobile terminal 500. At this time, the mobile terminal 500 may output a message 2032 indicating the completion of reception of the voice data.

Figure 20F:
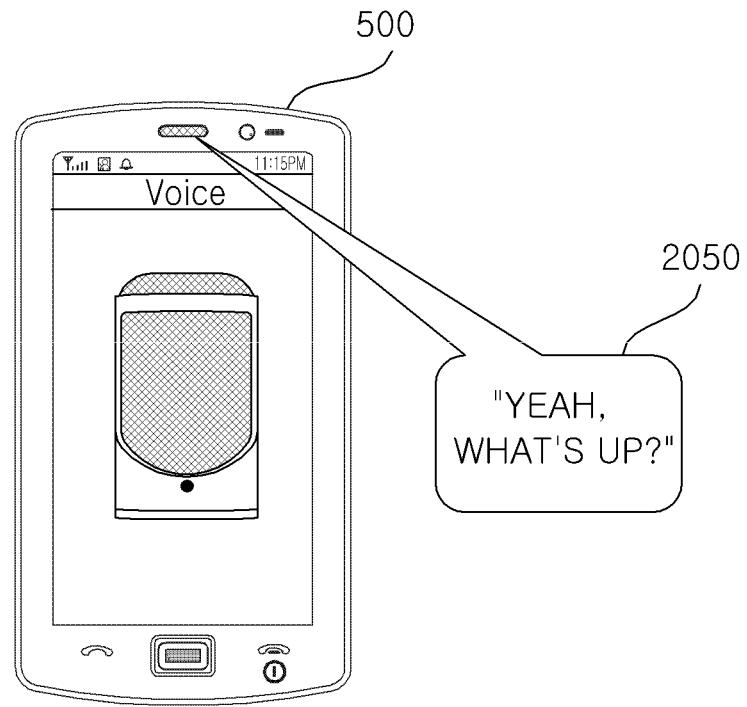
Figure 20F:
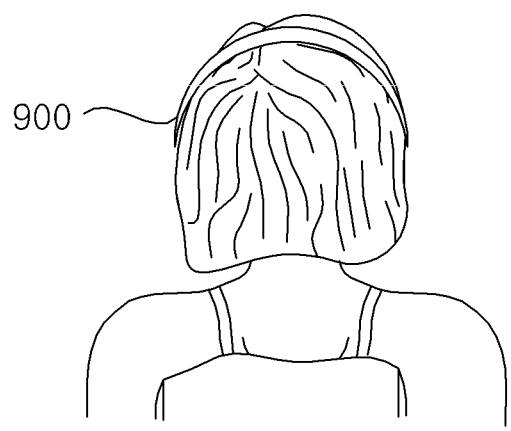

FIG. 20F illustrates that voice data 2050 received from the refrigerator is outputted from the mobile terminal 500. As a result, the user 900 of the mobile terminal may talk to the user 902 located in front of the refrigerator 200a over the telephone. Consequently, the user may easily and conveniently perform a desired operation.

Figure 21:
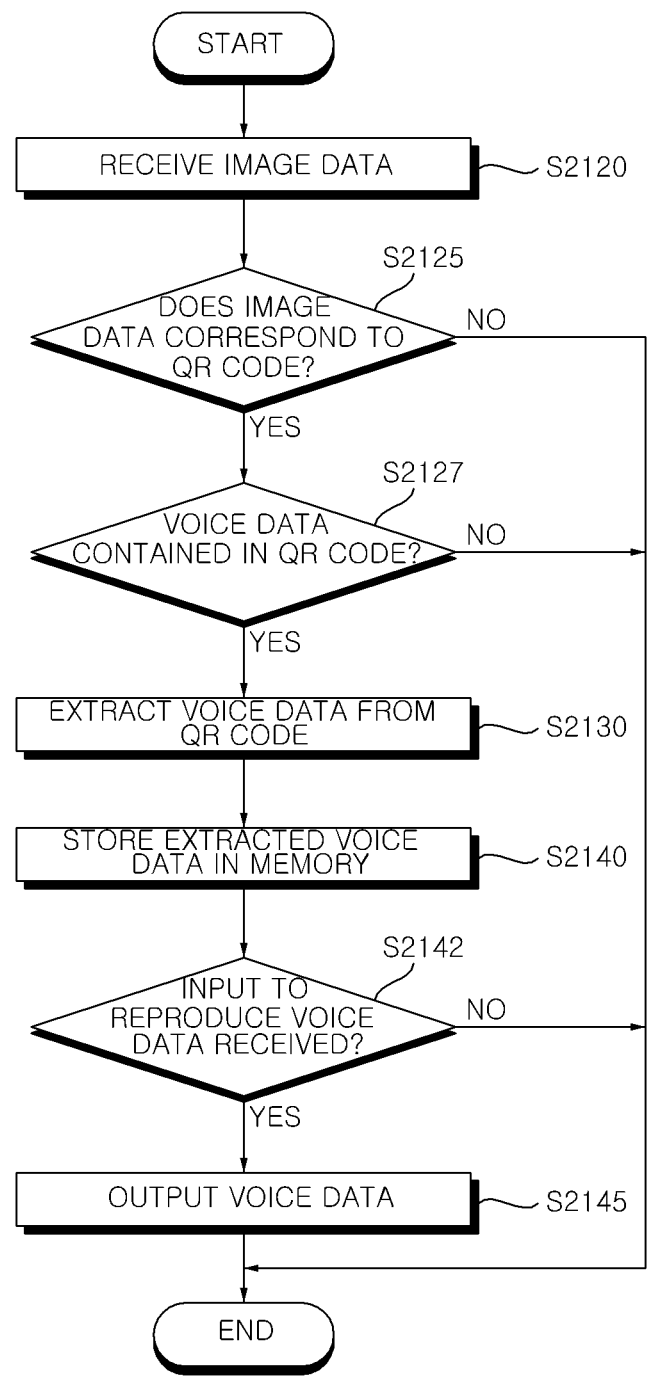
FIG. 21 is a flowchart showing an operation method of a home appliance according to a further embodiment of the present invention.
Figure 22A:
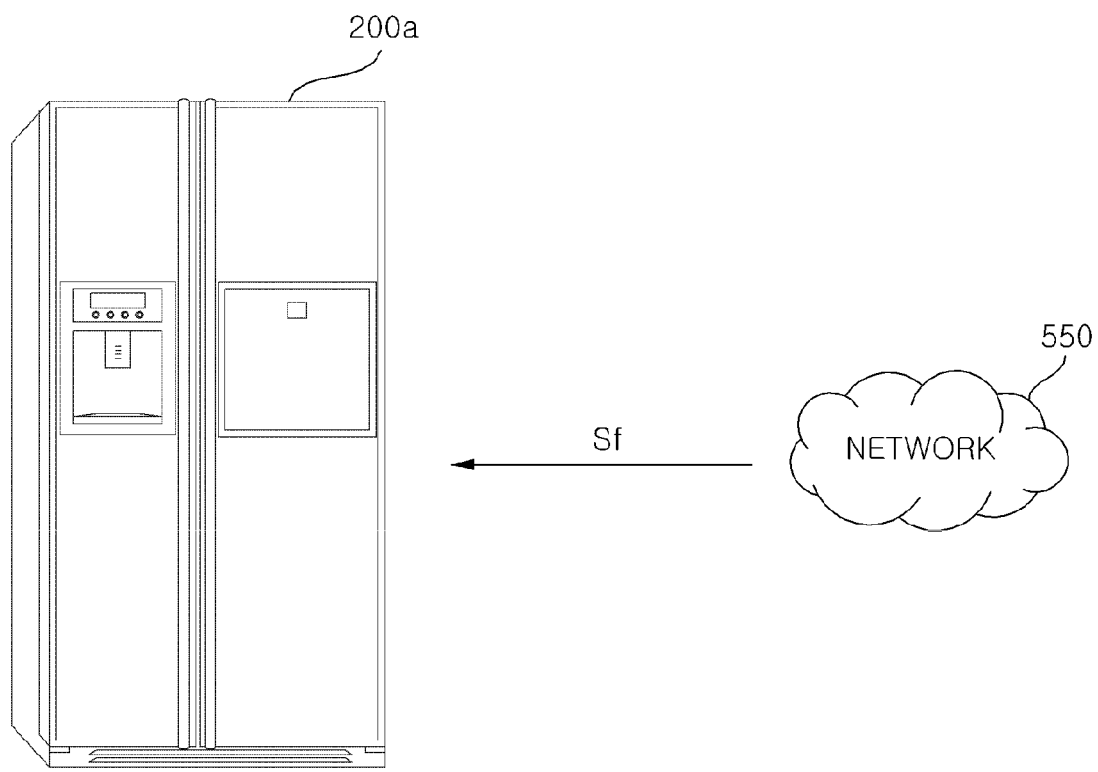
FIGS. 22A to 22C are reference views illustrating the operation method of FIG. 21.
Figure 22B:
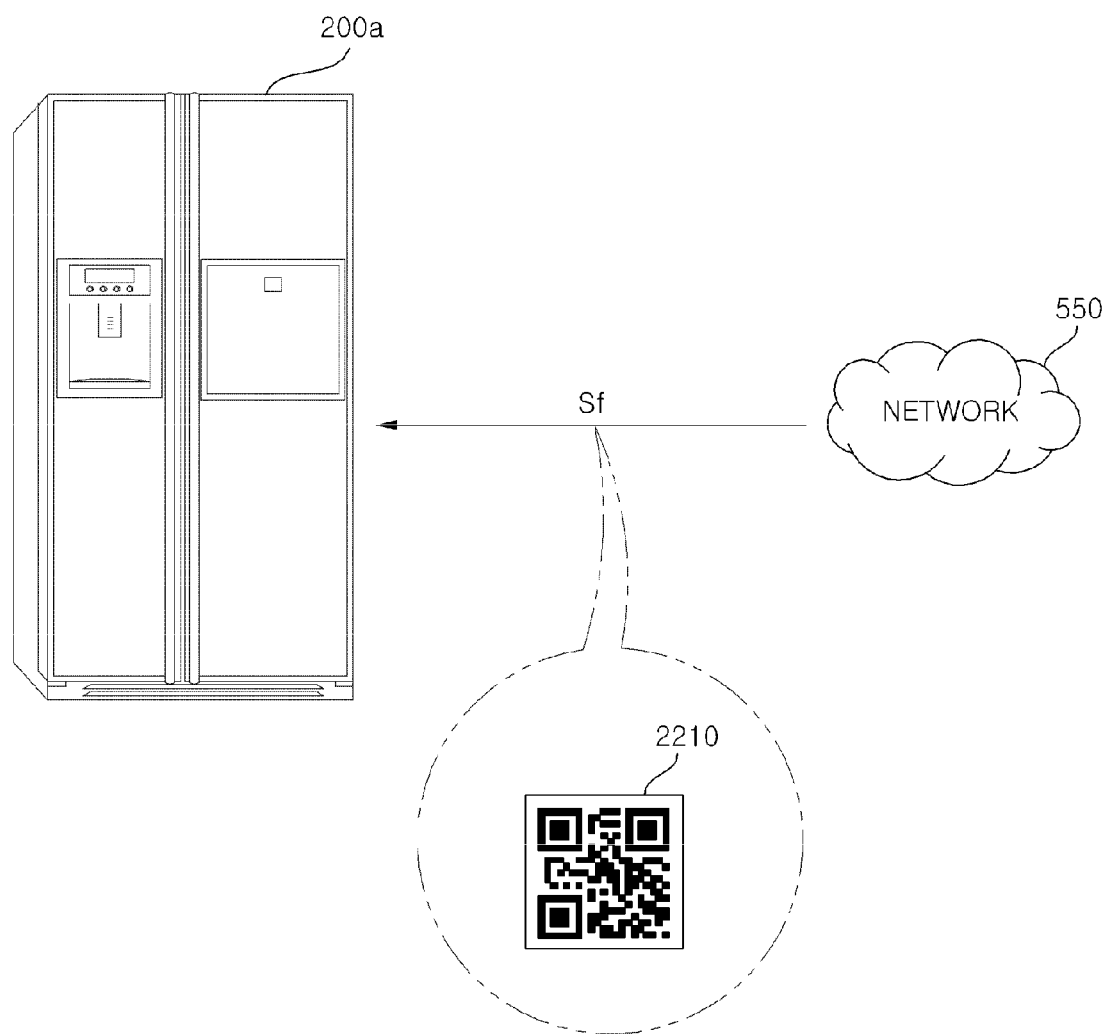
Figure 22C:
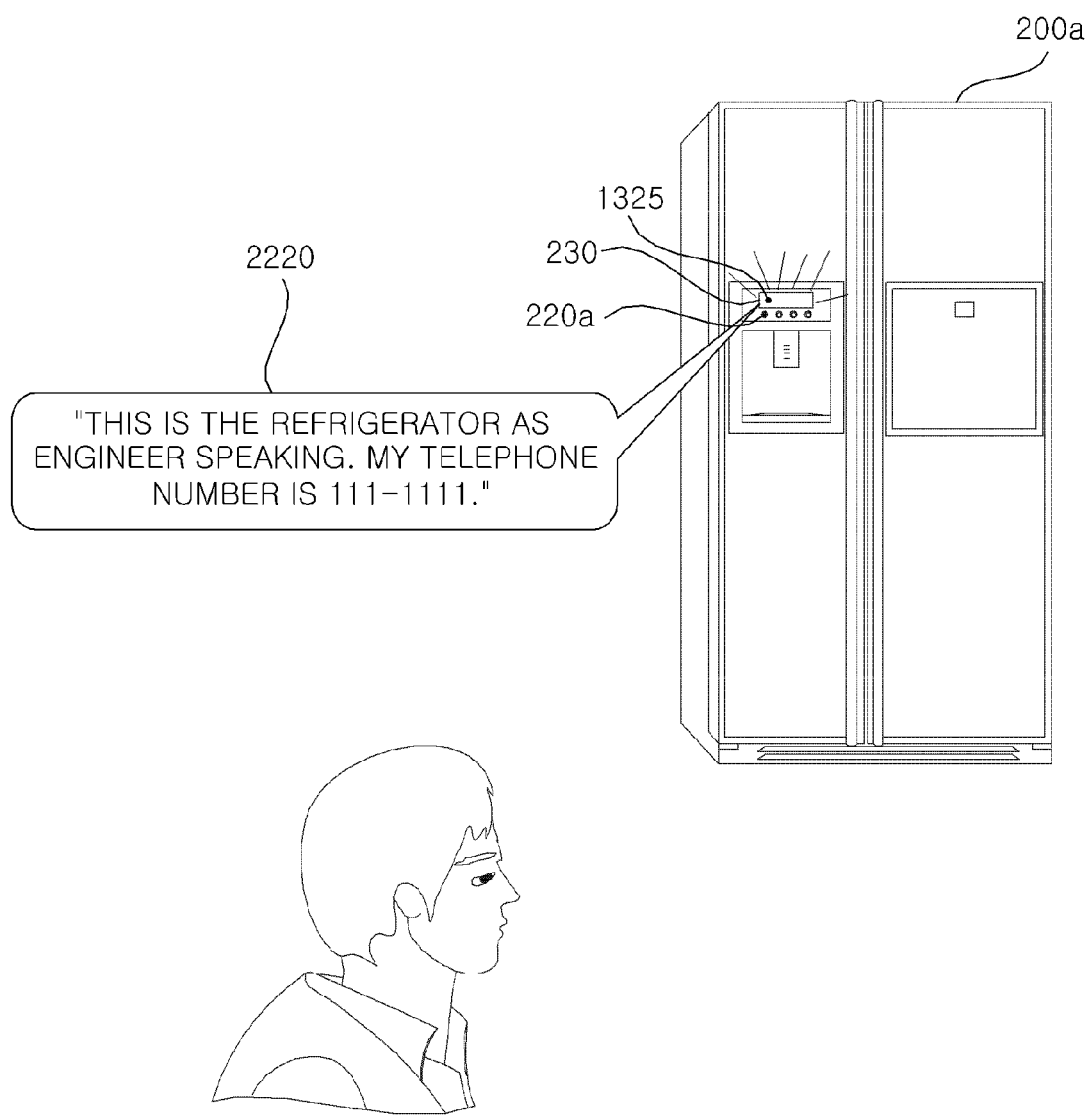

FIG. 21 is a flowchart showing an operation method of a home appliance according to a further embodiment of the present invention and FIGS. 22A to 22C are reference views illustrating the operation method of FIG. 21.

Hereinafter, an operation method of a home appliance will be described based on the refrigerator 200a.

Referring first to FIG. 21, the home appliance receives external image data (S2120) and determines whether the received image data includes a quick response (QR) code (S2125). Upon determining that the received image data includes the QR code, the home appliance determines whether the QR code includes voice data (S2127). Upon determining that the QR code includes the voice data, the home appliance extracts the voice data from the QR code (S2130) and stores the extracted voice data in the memory (S2140). Upon receiving an input to reproduce the voice data (S2142), the home appliance outputs the voice data.

The user of the mobile terminal may generate a desired QR code using a QR code generation program. The QR code may include voice data. For example, the QR code may include an address and details of a business card of the user.

The generated QR code may be transmitted from the mobile terminal 500 to another electric device as an image.

FIG. 22A illustrates that predetermined data is transmitted to the home appliance, specifically, the refrigerator 200a, via the external network 55.

Specifically, the predetermined data may image data including a QR code.

FIG. 22B illustrates that image data including a QR code image 2210 is transmitted to the home appliance, specifically, the refrigerator 200a, via the external network 55.

The controller 270 of the refrigerator 200a may perform signal processing with respect to the QR code image 2210 received through the communication unit 222. For example, in a case in which the memory 240 of the refrigerator 200a is provided with a QR code analysis program, the controller 270 of the refrigerator 200a may interpret the QR code image 2210 using the QR code analysis program. In another example, in a case in which the memory 240 of the refrigerator 200a is not provided with a QR code analysis program, the controller 270 may access the server 300 to interpret the QR code image 2210.

The controller 270 of the refrigerator 200a may confirm details of the QR code image 2210 and, in a case in which a voice memo is contained in the QR code image 2210, control the QR code image 2210 to be stored in the memory 240.

At this time, the display unit 230 may output a message 1325 indicating the reception of the voice memo. As a result, the user may intuitively recognize the reception of the voice memo.

When the user pushes a specific button 220a in the input unit 220 of the refrigerator 200a, a voice memo 2220 stored in the memory may be outputted as shown in FIG. 22C. As a result, the user may easily and conveniently acquire desired information.

The home appliance and the operation method thereof according to the present invention are not limitedly applicable to the constructions and methods of the embodiments as described above. For example, all or some of the embodiments may be selectively combined to achieve various modifications.

Meanwhile, the operation method of the home appliance according to the present invention may be realized as code, which is readable by a processor included in the home appliance, in recording media readable by the processor. The recording media readable by the processor include all kinds of recording devices to store data which are readable by the processor. Examples of the recording media readable by the processor may include a read only memory (ROM), a random access memory (RAM), a compact disc read only memory (CD-ROM), a magnetic tape, a floppy disk, and an optical data storage device. In addition, the recording media readable by the processor may also be realized in the form of a carrier wave, such as transmission through the Internet. Furthermore, the recording media readable by the processor may be distributed to computer systems connected to each other through a network such that code readable by the processor is stored or executed in a distributed manner.

As is apparent from the above description, according to an embodiment of the present invention, a home appliance may recognize an input voice and, in a case in which the recognized voice data includes information related to another home appliance, transmit the recognized voice data to the corresponding home appliance. Consequently, the home appliances may share the voice data. As a result, user convenience may be improved.

Meanwhile, the home appliance may transmit the voice data to the corresponding home appliance via at least one home appliance adjacent thereto, thereby easily and conveniently transmitting the voice data.

Meanwhile, in a case in which the home appliance receives voice data from another home appliance and the received voice data corresponds to an operation control command, the home appliance may perform a corresponding operation. On the other hand, in a case in which the received voice data corresponds to a voice memo, the home appliance may store the voice data in a memory. Consequently, the home appliance may perform a variety of operations. As a result, user convenience may be improved.

According to another embodiment of the present invention, a home appliance receives voice data from an external device, such as a mobile terminal, and, in a case in which the received voice data corresponds to an operation control command, the home appliance may perform a corresponding operation. On the other hand, in a case in which the received voice data corresponds to a voice memo, the home appliance may store the voice data in a memory. Consequently, the home appliance may be controlled through voice recognition.

Meanwhile, in a case in which the received voice data corresponds to a request for telephone conversation, the home appliance may perform telephone conversation. Consequently, a user may easily and conveniently perform a desired operation.

In particular, the mobile terminal may transmit the voice data recognized through voice recognition to the home appliance. Consequently, the home appliance may be easily and conveniently controlled.

According to a further embodiment of the present invention, a home appliance may receive image data and, in a case in which the received image data is a QR code image related to voice data, the home appliance may extract the voice data from the QR code and store the extracted voice data in a memory. Consequently, a user may easily and conveniently store desired details.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An operation method of a home appliance including a microphone, a wireless communication unit to exchange data with an external device, a drive unit to drive the home appliance, and a controller to control the microphone, the wireless communication unit, and the drive unit, wherein the controller outputs a first signal regarding a first speed command value to the drive unit for driving a motor at a target rotation speed, the method comprising:
    entering a voice recognition mode during driving the motor;
    receiving a voice data through the microphone or voice data from an external home appliance or a mobile terminal through the wireless communication unit;
    recognizing the received voice data through the controller;
    in a case in which the recognized voice data contains information related to a corresponding external home appliance,
    transmitting the recognized voice data to the corresponding external home appliance through the controller;
    determining whether the recognized voice data corresponds to an operation control command;
    upon determining that the recognized voice data corresponds to the operation control command, outputting a second signal regarding a second speed command value and driving the motor based on the second signal;
    upon determining that the recognized voice data is not the operation control command, determining whether the recognized voice data corresponds to a voice memo;
    upon determining that the recognized voice data corresponds to the voice memo, storing the voice data in a memory;
    upon receiving the voice memo, outputting a message indicating reception of the voice memo through the controller;
    upon receiving an input to reproduce the voice memo through an input unit, reproducing and outputting the stored voice data.

2. The operation method according to claim 1, wherein the step of recognizing the received voice data comprises:
    transmitting the received voice data to a server through the controller; and
    receiving the voice data related to the transmitted voice from the server.

3. The operation method according to claim 1, wherein the step of receiving the voice data comprises receiving the voice data via an access point device or at least one home appliance adjacent thereto.

4. The operation method according to claim 1, further comprising:
    in a case in which the voice data corresponds to a request for telephone conversation, receiving a call; and
    performing a telephone conversation.

5. The operation method according to claim 4, wherein the step of performing the telephone conversation comprises:
    receiving a voice through a microphone;
    transmitting the received voice to the external home appliance or the mobile terminal; and
    outputting voice data received from the external home appliance or the mobile terminal.

6. A home appliance comprising:
    a microphone;
    a memory;
    an audio output unit;
    a drive unit to drive the home appliance,
    a wireless communication unit to exchange data with an external device; and
    a controller configured to:
    output a first signal regarding a first speed command value to the drive unit for driving a motor at a target rotation speed,
    control the wireless communication unit to receive a voice data through the microphone upon entering a voice recognition mode during driving the motor,
    recognizing the received voice data through the controller,
    in a case in which the recognized voice data contains information related to a corresponding external home appliance, transmit the recognized voice data to the corresponding external home appliance,
    determine whether the recognized voice data corresponds to an operation control command;
    upon determining that the recognized voice data corresponds to the operation control command, output a second signal regarding a second speed command value and drive the motor based on the second signal;
    upon determining that the recognized voice data is not the operation control command, determine whether the recognized voice data corresponds to a voice memo;
    upon determining that the recognized voice data corresponds to the voice memo, store the voice data in the memory;
    upon receiving the voice memo, output a message indicating reception of the voice memo through the controller;
    upon receiving an input to reproduce the voice memo through an input unit, reproduce and output the stored voice data through the audio output unit.

7. The home appliance according to claim 6, wherein the wireless communication unit transmits the received voice data to a server and receives the voice data related to the transmitted voice from the server.

8. The home appliance according to claim 6, wherein the audio output unit outputs a message indicating reception of the voice memo upon receiving the voice memo.

9. The home appliance according to claim 6, wherein
    in a case in which the voice data corresponds to a request for telephone conversation, the controller controls a call to be received and telephone conversation to be performed through the audio input unit and the audio output unit.

10. The home appliance according to claim 6, further comprising:
    a camera to capture an image, wherein
    in a case in which the image captured by the camera contains a quick response (QR) code and the QR code contains voice data, the controller controls the voice data to be extracted from the QR code and the extracted voice data to be stored in the memory.

11. The home appliance according to claim 10, wherein the audio output unit reproduces and outputs the stored voice data upon receiving an input to reproduce the voice data corresponding to the QR code.

* * * * *